United States Patent
Inglefield

(10) Patent No.: US 7,098,275 B2
(45) Date of Patent: Aug. 29, 2006

(54) HEAT RESISTANT MATERIAL FOR MOLDS AND OTHER ARTICLES

(76) Inventor: Charles F. Inglefield, 19343 Frazi r Dr., Rocky River, OH (US) 44116

( * ) Notice: Subject to any disclaimer, the term of this patent is extended or adjusted under 35 U.S.C. 154(b) by 302 days.

(21) Appl. No.: 10/681,989

(22) Filed: Oct. 9, 2003

(65) Prior Publication Data

US 2004/0166243 A1   Aug. 26, 2004

Related U.S. Application Data

(63) Continuation-in-part of application No. 09/893,273, filed on Jun. 27, 2001, now Pat. No. 6,638,572.

(51) Int. Cl.
*C08K 5/54* (2006.01)
*C08J 9/24* (2006.01)
*B29C 43/00* (2006.01)
*B29C 67/00* (2006.01)
*B32B 5/00* (2006.01)

(52) U.S. Cl. ............... 525/474; 264/125; 264/126; 264/219; 264/319; 264/327; 264/331.11; 427/374.4; 427/376.2; 428/364; 428/402; 428/447

(58) Field of Classification Search ............ None
See application file for complete search history.

(56) References Cited

U.S. PATENT DOCUMENTS

| | | |
|---|---|---|
| 3,172,176 A | 3/1965 | Greenwood |
| 3,628,985 A | 12/1971 | Hider et al. |
| 4,769,197 A | 9/1988 | Kromrey |
| 4,795,600 A | 1/1989 | Kromrey |
| 4,962,162 A | 10/1990 | Kosuda et al. |
| 5,167,876 A | 12/1992 | Lem et al. |
| 5,219,498 A | 6/1993 | Keller et al. |
| 5,342,650 A | 8/1994 | Daly, III |
| 5,523,374 A | 6/1996 | Bard et al. |
| 5,552,466 A | 9/1996 | Beckley et al. |
| 5,612,399 A | 3/1997 | Beckley et al. |
| 5,623,030 A | 4/1997 | Tsumura et al. |
| 5,632,925 A | 5/1997 | Moulton et al. |
| 5,747,608 A | 5/1998 | Katsoulis et al. |
| 5,884,688 A | 3/1999 | Hinton et al. |
| 6,183,873 B1 | 2/2001 | Clarke |
| 6,265,333 B1 | 7/2001 | Dzenis et al. |
| 2004/0241443 A1 * | 12/2004 | Decker et al. .............. 428/402 |

OTHER PUBLICATIONS

Publication by General Electric Company entitled "GE Silicones" and "Material Safety Data Sheet Silicone Molding Compound", publication date unknown, but date printed is Mar. 28, 2000.
Publication by GE Silicones entitled "MC550BK1", publication date unknown, but prior to Jun. 5, 2001.
Publication by GE Toshiba Silicones Co., Ltd. entitled "TRIPLUS-Solventless Silicone Resin Blend System", publication date unknown, last copyright date 2000.
Publication by GE Silicones entitled "Technical Library-TRIPLUS-Solventless Silicone Resin Blend System", publication date unknown but copyright date 2001.
Publication GE Silicones and TRIPLUS 179, publication date unknown but prior to Apr. 20, 2001.
GE Silicones publication for product TPR178, entitled "Material Safety Data Sheet Polyalkylsiloxanes", publication date unknown, printed Mar. 28, 2000.

* cited by examiner

*Primary Examiner*—Randy Gulakowski
*Assistant Examiner*—Timothy J. Kugel
(74) *Attorney, Agent, or Firm*—Tarolli, Sundheim, Covell & Tummino LLP

(57) ABSTRACT

A mixture of particulate silicone based material and small hollow elements, such as spheres and/or fibers, is provided. The particulate silicone based material is heated to a temperature between about 200° F. and about 400° F. The particulate silicone based material is cooled until a solid body is formed. The solid body is resistant to melting and thermal decomposition when heated to temperatures of at least 3000° F. The solid body may contain cavities formed by the small hollow elements. The solid body may contain reinforcing fibers. The solid body may contain both small hollow elements and fibers.

79 Claims, 5 Drawing Sheets

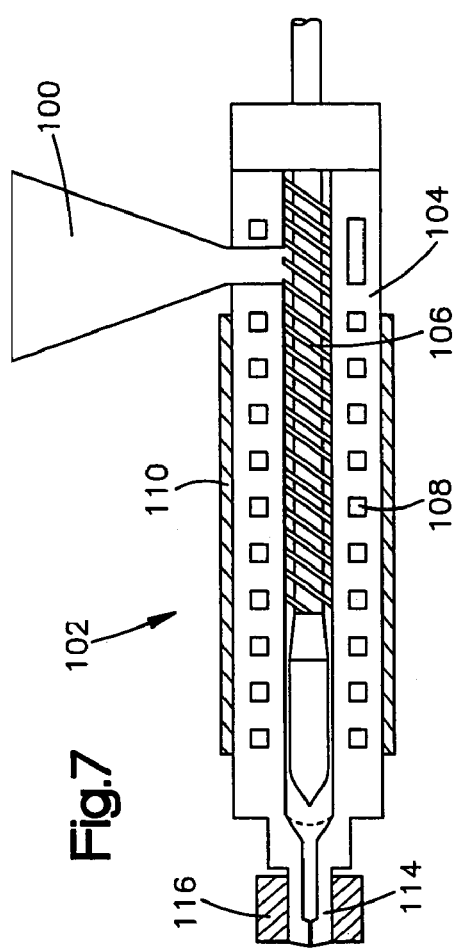
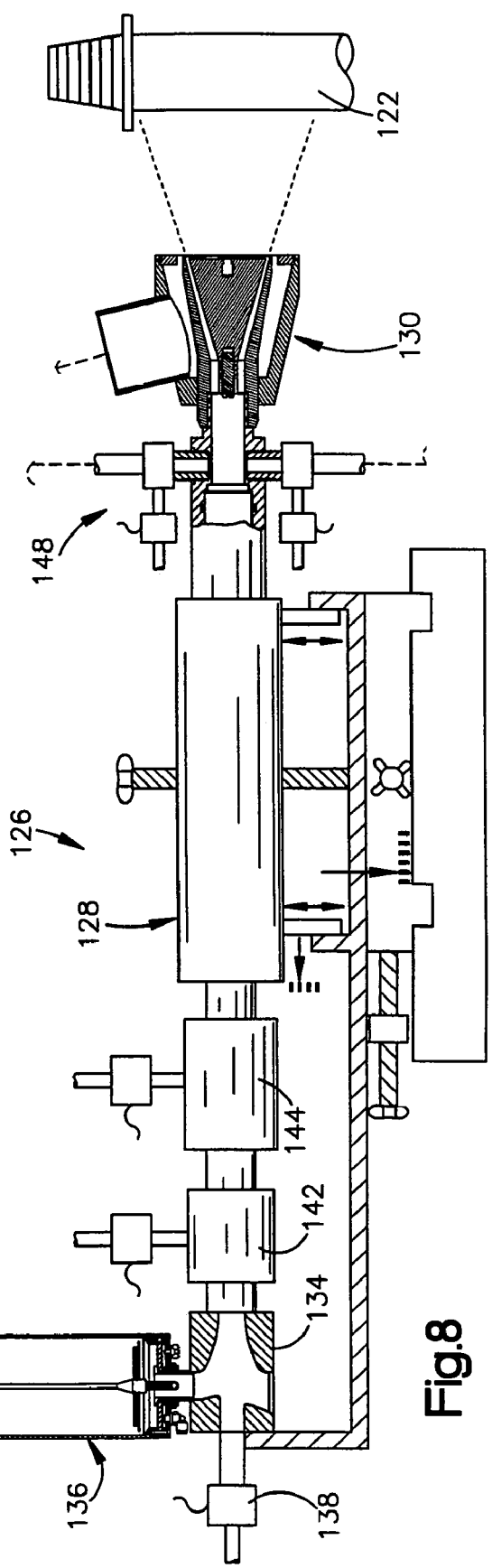
Fig.7
Fig.8

HEAT RESISTANT MATERIAL FOR MOLDS AND OTHER ARTICLES

RELATED APPLICATION

This application is a continuation-in-part of U.S. patent application Ser. No. 09/893,273 filed Jun. 27, 2001 (now U.S. Pat. No. 6,638,572). The benefit of the earlier filing date of the aforementioned application Ser. No. 09/893,273 is hereby claimed.

FIELD OF THE INVENTION

The present invention relates to a heat resistant material, and to the making of articles which are at least partially formed of the heat resistant material.

BACKGROUND OF THE INVENTION

The casting of metal articles using sand molds and sand cores is well known in the art. A sand mold can be made from a mixture of sand and an organic binder by packing the mixture loosely or tightly around a pattern. The pattern is then removed, leaving a cavity in the sand that replicates the shape of the pattern. Once the organic binder is shape-stabilized by a curing technique, the cavity in the mold is filled with a molten metal by pouring the molten metal into the mold.

Sand mold cores can be made by placing a sand and binder mixture into a core box. There, the sand and binder mixture takes the shape of the cavity in the box, becomes hard, and is removed. After the mold is made, the core is then set in the mold. Molten metal is poured in the mold and fills the mold except where the sand core is present.

The binder materials used in making the sand molds, and sand cores can include inorganic binders, organic binders, and organometallic binders. Oraganometallic binders are uniquely suited for use as binders for sand molds and sand cores because they provide strength to the sand molds and sand cores at extremely low binder levels. Additionally, organometallic binders can be used to bind particles together to make shapes directly.

U.S. Pat. No. 5,884,688 discloses a method of fabricating shaped bodies such as negatives of parts to be made, as well as, shapes directly. The method comprises coating sand with liquid organic-metallic binder, forming a shape from said binder mixture, and hardening said binder mixture to form the shaped body. One organometallic binder is a polyureasilazane.

U.S. Pat. No. 5,552,466 discloses a method of producing an article with high temperature and thermal shock resistance comprising forming a blend of at least one lower viscosity silicone polymer. The blend is disclosed as being "cermitizable" at a temperature above about 1100° F. (590° C.). An article, formed in accordance with the patent, contains a layer of material formed from a silicone blend.

SUMMARY OF THE INVENTION

The present invention relates to a material and method for forming a heat resistant composite. A particulate silicone based material may be provided. The particulate silicone based material is heated to a temperature between about 200° F. and 400° F. The particulate silicone based material is cooled until a solid composite is formed. The solid composite is resistant to melting and thermal decomposition when heated to temperatures of at least about 3000° F. The particulate silicone based material may be formed by mixing liquid silicone resin with a catalyst and powdered silicone molding compound. The result may be a particulate which appears to be dry.

A heat resistant solid body containing cavities may be formed of the silicone based material. To form the cavities, small hollow elements may be mixed with a particulate silicone based material. The small hollow elements may have a spherical configuration.

A mixture of the particulate silicone based material and the small hollow elements is heated to a temperature between about 200° F. and 400° F. The particulate silicone based material is cooled until a solid body or composite is formed. The solid body contains cavities which are formed by the small hollow elements. The solid body in which the cavities are formed, is resistant to melting and thermal decomposition when heated to a temperature of at least about 3000° F.

A heat resistant solid body which is fiber reinforced may be formed of the silicone based material. To form a fiber reinforced heat resistant solid body, fibers are covered with the silicone based material. The silicone based material and fibers are heated to a temperature between about 200° F. and 400° F. The silicone based material is cooled to form a solid fiber reinforced body. The solid fiber reinforced body is resistant to melting and thermal decomposition when heated to a temperature of at least about 3000° F.

When the fibers are covered by the silicone based material, the silicone based material may be in a viscous form and/or in a particulate form. The fibers may be either solid or hollow. Small hollow elements may be mixed with the fibers and silicone based material. The small hollow elements may have a spherical configuration or a different configuration.

It should be understood that the silicone based material of the present invention has many different uses. For example, the silicone based material of the present invention may be used to form a core or mold which is used in forming other articles. Alternatively, the silicone based material may be used to form an article itself. As another alternative, the silicone based material may be used as a covering. It is contemplated that the silicone based material of the present invention may be used in many different ways in addition to the specific ways described herein.

BRIEF DESCRIPTION OF THE DRAWINGS

The foregoing and other features of the present invention will become more apparent to one skilled in the art upon consideration of the following description of the invention and the accompanying drawing in which:

FIG. 7 is a schematic illustration of a screw type extruder for shaping silicone based material in accordance with another feature of the present invention;

FIG. 8 is a schematic illustration of an electrostatic spray apparatus for applying a covering of silicone based material in accordance with another feature of the present invention;

DESCRIPTION

Silicone Based Material

Figure 1:
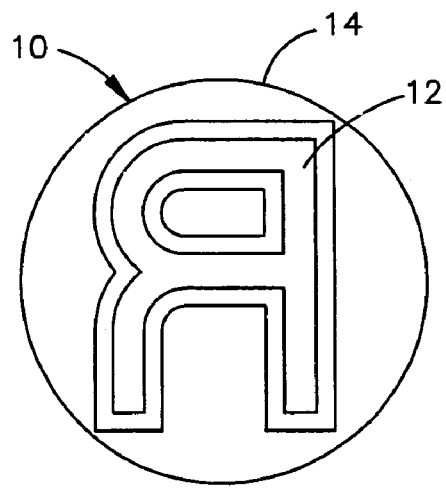
FIG. 1 is a schematic illustration of a casting mold formed of silicone based material in accordance with one feature of the present invention.

The present invention relates to a particulate silicone based material that can be used form a composite that has a high temperature resistance and thermal shock resistance. By "high temperature resistance" it is meant the ability of the material to withstand melting and/or decomposition when exposed to high temperatures (i.e., temperatures greater than about 3000° F.). By "thermal shock resistance" it is meant the ability of the material to withstand stress induced within the material when the material is exposed to a sudden temperature increase.

The dry, particulate silicone based material is prepared by adding to a conventional mixing apparatus a silicone molding compound, a silicone resin, and a catalyst. The silicone molding compound is a powder. The silicone resin is a liquid. The catalyst is a powder. The resulting dry particulate has an appearance similar to the appearance of a dry, gray, flour with small lumps. The resulting dry particulate is a free flowing powder which is referred to herein as a silicone based material.

The silicone molding compound is processed through a hammer mill to form a powder that contains particles of silica and a silesquioxane polymer. The silesquioxane polymer has the general structural repeating unit RSiO3/2, wherein R is a methyl group, a phenyl group, or a mixture of both. The silesquioxane polymer is believed to have a number of structures, including the following structures:

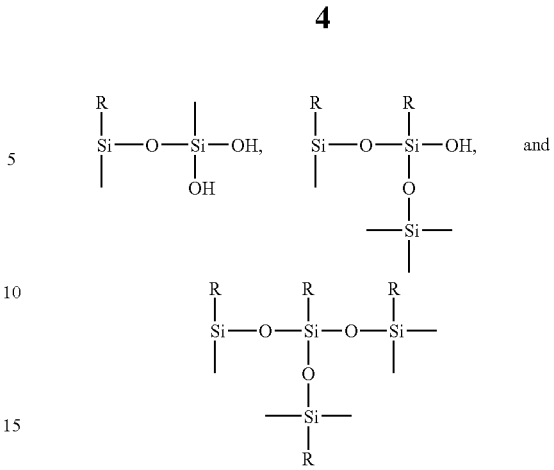

A preferred silicone molding compound that includes silica and a silsesquioxane polymer is MC550BK1 which may be referred to as MC550. MC550 is commercially available from GE Silicones of Waterford, N.Y. in the form of granular particles. The exact chemical composition of MC550 is not known; however, a material safety data sheet published by GE Silicones states that MC550 includes, by weight of the MC550, about 60% to about 80% fused silica, about 10% to about 30% fibrous glass, about 1% to about 5% amorphous silica, and about 10% to about 30% of a dimethyl silicone polymer with phenylsesquisiloxane. MC550 is pre-catalyzed so that granular particles of MC550 upon being heated to a temperature of about 177° C. to 193° C. cures into a solid mass.

The commercially available, granular molding compound, that is, MC550, is processed to form a powder. The amount of powdered silicone molding compound added to the to the conventional mixing apparatus is preferably about 90% to about 98% by weight, based on the combined weight of the silicone molding compound, the silicone resin, and the catalyst. More preferably, the amount of silicone molding compound added to the conventional mixing apparatus is about 95% by weight, based on the combined weight of the silicone molding compound, the silicone resin, and the catalyst.

The silicone resin of the present invention is a liquid silicone polymer at room temperature. The silicone resin, when mixed with the silicone molding compound wets the silicone molding compound and is absorbed by the silicone molding compound. Examples of silicone resins that are liquids at room temperature and that are capable of being absorbed by the silicone transfer molding compound include polydiorganosiloxane homopolymers such as silanol terminated polydiorganosiloxane polymers, methyl siloxane resins, and mixtures thereof.

A preferred silicone resin is a mixture of polydiogana-disiloxane resins commercially available from GE Silicones of Waterford, N.Y. under the tradename TRIPLUS. TRIPLUS is a solventless silicone resin system that includes a dimethylpolysiloxane silanol (TPR 178) and a methylsiloxane resin (TPR 179).

The weight ratio of TPR 178 to TPR 179 utilized in the silicone based material effects the hardness of the composite formed the silicone based material. As the weight ratio of TPR 178 relative to TPR 179 in the silicone base material increases, the durometer hardness of the composite formed from the silicone based material increases. Conversely, as the weight percentage of TPR 178 to TPR 179 decreases, the durometer hardness of the composite material formed the silicone based material decreases. Preferably, the weight ratio of TPR 178 to TPR 179 in the silicone resin is about 1:2 to about 2:1. More preferably, the weight ratio of TPR 178 to TPR 179 in the silicone resin is about 1:1.

Examples of other commercially available polydiorganosiloxane homopolymers similar to TRIPLUS are commercially available from Dow Corning, under the following trade names: DC-801, DC-804, DC-805, DC-806A, DC-808, DC-840, DC-2103, DC-2104, DCQ-1-2529, DCQ-1-2530, DCQ-2531, P50X, and P80X.

The amount of silicone resin added to the to the conventional mixing apparatus is preferably about 2% to about 10% by weight, based on the combined weight of the silicone molding compound, the silicone resin, and the catalyst. More preferably, the amount of silicone resin added to the conventional mixing apparatus is about 5% by weight, based on the combined weight of the silicone molding compound, the silicone resin, and the catalyst.

The catalyst of the present invention is a metal powder that when mixed and heated with the silicone resin facilitates curing of the silicone resin. Preferred catalysts are zirconium and zinc octoate. Examples of other catalysts that can be used to cure the silicone resin are cobalt octoate, iron octoate, and stannous octoate.

The amount of catalyst added to the conventional mixing apparatus is that amount effective to initiate curing of the silicone resin when the silicone based material is heated to a temperature of at least about 200° F. A preferred amount of catalyst added to the conventional mixing apparatus is up to about 0.50% by weight, based on the weight of the silicone molding compound, the silicone resin, and the catalyst. A more preferred amount of catalyst added to the conventional mixing apparatus is about 0.1% by weight, based on the weight of the silicone molding compound, the silicone resin, and the catalyst.

In order to reinforce the silicone based material and the composite formed from the silicone based material, a filler may be added to the conventional mixing apparatus and mixed with the silicone molding compound, the silicone resin, and the catalyst. The filler material may be a fibrous material, a particulate material, or a combination thereof. Preferably, the filler is composed of discontinuous fiber such as whiskers, particles, and mixtures thereof.

A preferred filler material that may be added to the conventional mixing apparatus and mixed with the silicone molding compound, the silicone resin, and the catalyst is a heat resistant filler material. Heat resistant filler materials for use in composites are well known in the art. Preferred heat resistant filler materials include a talc filler such as CANTAL, chopped fiberglass strands, a mineral fiber such as LAPINOUS, and mixtures thereof.

The amount of filler material added to the conventional mixing apparatus and mixed with the silicone molding compound, the silicone resin, and the catalyst, will vary with the end use of the composite. A preferred amount of filler material added to the conventional mixing apparatus and mixed with the silicone molding compound, the silicone resin, and the catalyst is that amount sufficient to be effective for imparting mechanical and thermal characteristics required for the end use of the composite. More preferably, the amount of filler material added to the conventional mixing apparatus and mixed with the silicone molding compound, silicone resin, and catalyst is up to about 35% by weight, based on the combined weight of the silicone molding compound, the silicone resin, the catalyst, and the filler material.

The silicone molding compound, the silicone resin, the catalyst, and the filler, if utilized, are blended in the conventional mixing apparatus until a uniform mixture is achieved. The blended mixture is a dry particulate having the consistency of a very fine sand and is referred to herein as the silicone based material. The average particle size of the blended mixture forming the silicone based material may be reduced by grinding or milling the particles of the blended mixture. The particulate silicone based material so formed is a dry, free flowing powder and has the consistency of confectionary sugar with small lumps.

Forming A Composite Article

When the silicone based material is heated to a temperature between about 200° F. and about 400° F. for a period of time, the discrete particles of the dry, free flowing powder become interconnected. As this occurs, the particle size appears to increase. This apparent increase in particle size is believed to be the result of interconnection of relatively fine particles of the silicone based material. Thus, it is believed that there is an agglomeration of fine particles to form coarse particles when the silicone based material is heated to a temperature between about 200° F. and about 400° F.

At the same time that the particle size is apparently increasing, the adjacent particles are interconnecting to form a solid unitary composite article. Although it is believed that the fine particles of the silicone based material are interconnecting to form coarser particles which are interconnected to form a solid unitary composite article, the fine particles may be interconnecting without forming coarser particles. When the fine particles of the silicone based material are tightly packed, it appears that the fine particles become interconnected with little or no increase in particle size.

When the one-piece article is initially formed by interconnection of particles of the silicone based material and is still at a temperature of about 200° F. and about 400° F., the article can be easily deformed plastically by the application of force to the article. When the one-piece article is removed from the furnace and has cooled to a temperature below 200° F. and above ambient temperature, the one-piece article can be manually deformed to change the configuration of the article. At this time, the one-piece article is malleable and can be manually deformed to plastically change the configuration of the article in much the same manner as in which modeling clay is manually deformed.

As the one-piece article continues to cool, the article becomes more resistant to plastic deformation. When the one-piece article has cooled to ambient temperature, the one-piece article is rigid. However, the one-piece article does not become overly brittle as it becomes rigid.

When the one-piece article was formed as a disc having a diameter of seven centimeters (7 cm) and a thickness of one and a quarter centimeters (1.25 cm), the disc broke into several large pieces when it was placed on a cement floor and struck with a hammer. The disc did not shatter in a manner similar to the manner in which glass shatters when struck by a hammer. However, prior to cooling of the disc to ambient temperature, the disc was sufficiently malleable to enable the disc to be plastically deformed by the manual application of force to the disc.

It is theorized that heating and cooling of the silicone based material causes the silicone polymers in the silicone based material to cross-link and form a rigid three-dimensional silicone polymer network. It is also believed that the oxygen in the silicone polymer network forms hydrogen bonds with the pendant hydroxyl groups of silica from the silicone molding compound, as shown below:

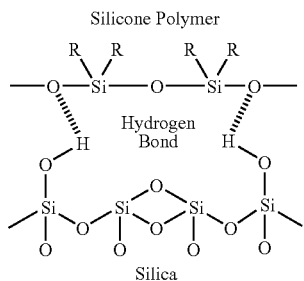

The hydrogen bonding of the silicone polymer network with the silica is advantageous because the hydrogen bonding increases the temperature resistance and thermal shock resistance of the solid composite.

For instance, the solid composite so formed was heated in an oven to a temperature of at least about 3000° F. upon being heated to a temperature of at least about 3000° F. the solid composite did not melt or thermally decompose. Moreover, the solid composite was exposed to a flame having a temperature of about 5000° F. The area of the solid composite exposed to the flame did not melt or thermally decompose. Additionally, upon cooling, the area of the solid composite exposed to the flame exhibited no evidence of thermal shock such as stress cracking.

The particulate silicone based material of the present invention can be used to form, or at least partially form various articles that require high temperature resistance and resistance to thermal shock. Many different types of articles can be formed of the silicone based material, such as coatings, engine components, and furnace linings. It should be understood that the foregoing are merely some examples of the many different uses for articles formed or partially formed of the silicone based material of the present invention.

Mold

In accordance with one embodiment of the present invention the particulate silicone based material can be used to form a mold and/or core for the casting molten material such as a molten metal. FIG. 1 is a schematic illustration of a mold 10. The mold 10 comprises a first body 14 and a first article defining cavity 12. The first article defining cavity 12 has the shape and size of an article to be cast using the casting mold 10.

The casting mold may also include a second body (not shown) that may be affixed to the first body. The second body can have a second article defining cavity which is complementary in size and shape to the first article defining cavity. The second body is formed in the same way and of the same material as the first body 14. When the mold includes a second body, which is affixed to the first body, the first body and/or the second body can include a sprue for admitting molten metal into the first article defining cavity and the second article defining cavity.

Figure 2:
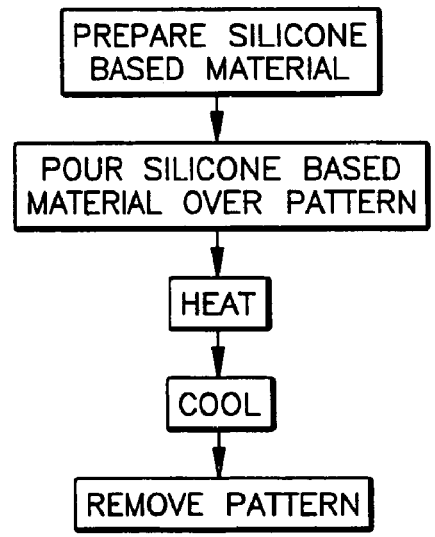
FIG. 2 is a schematic block diagram illustrating a method of forming the casting mold of FIG. 1.

FIG. 2 is a block flow diagram of a method of preparing the mold 10 of FIG. 1. The casting mold 10 is prepared by mixing the silicone molding compound (MC550), the silicone resin, the catalyst, and filler, if utilized, to form the dry, free flowing, particulate silicone based material.

An article defining pattern is placed in a container. The specific mold 10 illustrated in FIG. 1 is to be used to cast a metal article having the configuration of the letter "R". Therefore, the pattern and mold cavity 12 have configurations which are functions of the configuration of the letter "R".

An amount of dry powdered silicone based material is then transferred to the container and placed over the article defining pattern. The powder forming the silicone based material can be transferred to the container by pouring the free flowing powder forming the silicone based material into the container or injecting the silicone based material into the container. The amount of particulate silicone based material transferred to the container is that amount effective to cover the article defining pattern to an adequate depth. About ½ inch above the highest point of the article defining pattern is normally an adequate depth of the particulate silicone based material over the article defining pattern.

Once the particulate silicone based material covers the article defining pattern, pressure may be applied by a pressing assembly to the particulate silicone based material covering the article defining pattern to compact the particulate silicone based material. The greater the pressure utilized to pack the powdered silicone based material into the container holding the article defining pattern, the finer will be the particles formed and interconnected during heating of the silicone based material to a temperature of about 200° F. to about 400° F. Thus, if the particulate silicone based material is merely poured into the container holding the article defining pattern, without packing of the silicone based material, relatively coarse particles are formed and interconnected upon heating of the silicone based material. If the particulate silicone based material is firmly packed into the container holding the article defining pattern, relatively fine particles are formed and interconnected upon heating of the silicone based material.

The container, holding the article defining pattern and particulate silicone based material, may be placed in a conventional apparatus for heating such as an oven. The container, article defining pattern, and silicone based material are heated to a temperature of about 200° F. to about 400° F. Although the particulate silicone based material was lightly packed into the container before the container was placed in the heating apparatus, pressure was not applied against the particulate silicone based material while it was in the heating apparatus. As the silicone based material is heated, the particles of the silicone based material increase in size and become interconnected to form a unitary, one-piece composite article.

In the present example, the composite one-piece article is the mold 10. The composite article, that is, the mold 10, includes silicone polymers which form a continuous material and silica which forms a discontinuous material. The discontinuous material may also include filler material.

After being at a temperature of between about 200° F. and 400° F. for a period of time, for example about thirty minutes, the container, with the interconnected particles of the silicone based material therein, is removed from the oven and allowed to cool. Upon cooling to ambient (room) temperature (70° F.), the silicone based material forms a rigid composite. The container and the article defining pattern are then separated from the solid composite to form the casting mold 10 with the first article defining cavity 14, as shown in FIG. 1.

Surprisingly, it has been found that the casting mold 10 produced by the process of the present invention has a smooth surface that is free of macro-irregularities such as surface imperfections and cracks that are visible to the naked eye. It is believed that this smooth surface can be attributed to using a minimal amount of a solventless binder. By using only a minimal amount of solventless binder, the silicone base material, when curing, produces a minimal amount of off-gassing (i.e., bubbles of gas by-products that are formed by the curing chemical reaction). Gas bubbles, which form on the surface of the casting mold, have previously been one source of irregularities in a casting mold.

The mold 10 is resistant to melting and thermal decomposition when heated to temperatures of at least about 3000° F. The mold 10 does not deflect or otherwise deform when the mold is heated to a temperature of at least about 3000° F. and force is applied against the mold. Thus, a one-piece composite article was formed of the silicone based material, in the manner previously explained, and had the same size and configuration as the mold 10. The one-piece composite article, which is identical to the mold 10, was heated to a temperature of approximately 5000° F. While the one-piece composite article was at a temperature of approximately 5000° F. or slightly less, the article was dropped through a distance of approximately 3 feet onto a concrete floor. There was no substantial deformation of the hot (approximately 5000° F.) article as a result of being dropped.

In addition, there was no significant thermal decomposition of the one-piece composite article corresponding to the mold 10 as a result of heating of the one-piece article. Thus, the aforementioned one-piece composite article, which is identical to the mold 10, did not undergo any significant thermal decomposition when it was heated to a temperature of approximately 5000° F. Although there was no significant thermal decomposition of the aforementioned composite article as a result of being heated to 5000° F., the filler material in the article was burned as the article was heated. Burning of the filler material merely darkened areas on the composite article and did not result in any significant changes in the structure of the article.

Article

Figure 3:
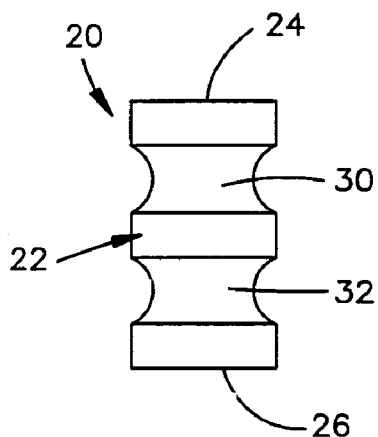
FIG. 3 is a schematic illustration of shaped article formed of silicone based material in accordance with another feature of the present invention.

In accordance with a second embodiment of the present invention the silicone based material can be used to form a shaped article rather than a mold for an article. FIG. 3 is a schematic illustration of a shaped article 20 prepared in accordance with the present invention. The shaped article has a generally cylindrical body 22 with a first circular end 24 and a second circular end 26. The body includes a first annular groove 30 and a second annular groove 32 that is axially spaced from the first groove.

Figure 4:
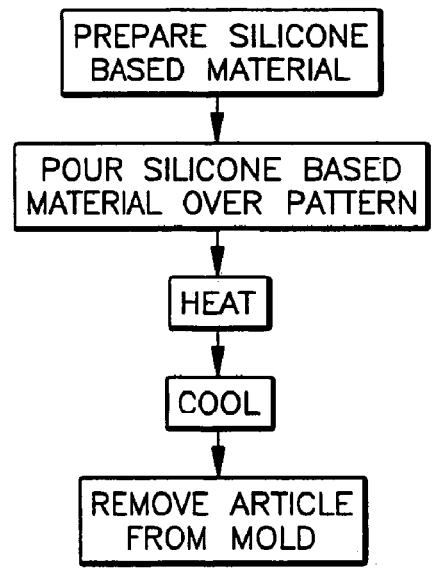
FIG. 4 is schematic block diagram of a method of forming the shaped article of FIG. 3.

FIG. 4 is a block flow diagram of a method of preparing the shaped article of FIG. 3. The block flow diagram of FIG. 4 for the shaped article 20 is similar to the block flow diagram of FIG. 2 for the mold 10. The shaped article 20 (FIG. 3) is prepared by mixing the silicone molding compound (MC550), the silicone resin, the catalyst, and filler, if utilized, to form the dry, particulate silicone based material. The dry silicone based material is a free flowing powder.

A mold is provided with a cavity. The mold can be any type of mold commonly used in molding a material. The mold may have a cope and drag section which define the mold cavity. The mold may be formed of a plurality of metal sections which are interconnected to form the mold cavity. The mold cavity has a size and shape corresponding to the size and shape of the article 20 of FIG. 3. The mold also includes a sprue or passage for admitting the particulate silicone based material into the mold. It is contemplated that the mold may have any one of many different known constructions.

The particulate silicone based material is transferred into the mold cavity until the mold cavity is filled with the particulate silicone based material. The particulate silicone based material is a free flowing powder and can be transferred into the mold cavity by pouring the particulate silicone based material through the sprue into the mold cavity. Pressure can be applied to the silicone based material to compact the silicone based material within the mold.

Thereafter, the mold containing the particulate silicone based material is placed in a conventional heating apparatus such as commercial oven and heated to a temperature of about 200° F. to about 400° F. for about thirty minutes. The mold and silicone based material therein are heated at a temperature of about 250° F. to about 350° F. until the particles of the silicone based material are interconnected to form the one-piece article 20 (FIG. 3). During heating of the mold, pressure can maintained on the silicone based material. However, during heating of the mold containing the silicone based material to form the one-piece article 20, the silicone based material was merely packed into the mold and was not pressurized.

The mold with the silicone based material therein is removed from the oven and allowed to cool. Upon cooling to ambient temperature (approximately 70° F.), the silicone based material forms a rigid composite article 20. The sections of the mold are then separated from the rigid composite to release the shaped article 20 shown in FIG. 3.

If the shaped article 20 is removed from the mold before the shaped article cools to ambient temperature, the shaped article can be plastically deformed while it is still at a temperature between about 100° F. and about 200° F. This enables the shape which is imparted to the article 20 to be modified after the article has been removed from the mold.

Surprisingly, it has been found the shaped article 20 formed by this process has a consistency that allows it to be drilled and tapped. Drilling and tapping of the shaped article, permit the shaped article to be connected to fasteners, such as screws.

It is contemplated that the shaped article 20 may be utilized as an insulator for electrical wires. It is believed that the shaped article 20 will be particularly advantageous for use as an insulator for electrical wires in environments where electrical wires are exposed to relatively high temperatures and the wires are to conduct relatively high voltages. For example, an electrical wire conducting a voltage of approximately 1,000 volts could be wrapped at least part way around the groove 30 in the shaped article 20. A second electrical wire, also conducting approximately 1,000 volts, could be wrapped at least part way around the groove 32. The one-piece composite shaped article 20 is electrically insulating and prevents a flow of current between the two wires. The one-piece composite shaped article 20 remains electrically insulating when subjected to relatively high temperatures, that is, to temperatures in excess of 2,000° F. Of course, the shaped article 20 could be utilized as an insulator in environments where the shaped article 20 is not exposed to relatively high temperatures.

It is contemplated that the silicone based material of the present invention may be used to form mold and/or core patterns. The mold and/or core patterns would be utilized to shape mold material. Thus, mold and/or core patterns formed of the silicone based material would be utilized to form a mold cavity. The mold cavity would be filled with any material from which it is desired to form a mold.

Press Assembly

Figure 5:
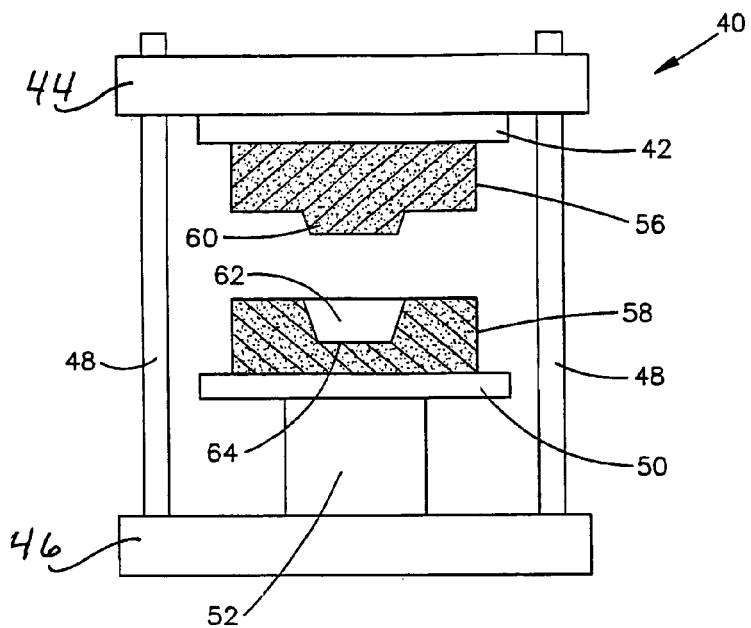
FIG. 5 is a schematic illustration of a press assembly for shaping silicone based material in accordance with another feature of the present invention.

A known press assembly 40 is illustrated schematically in FIG. 5 and may be utilized to shape the silicone based material of the present invention to a desired configuration. It should be understood that the press assembly 40 is illustrated schematically in FIG. 5 and is representative of many known types of compression molding press assemblies.

The press assembly 40 includes an upper platen 42 which is mounted on stationary upper frame member 44. The stationary upper frame member 44 is connected to a stationary lower frame member 46 by a plurality of upstanding posts 48. A lower platen 50 is mounted on a hydraulic plunger 52 which is operable to move the lower platen toward and away from the upper platen 42.

An upper mold section 56 is fixedly secured to the upper platen 42 and cooperates with a lower mold section 58. A projection 60 on the upper mold section 56 cooperates with a recess 62 in the lower mold section 58 to define a mold cavity when the lower mold section 58 is raised into engagement with the upper mold section 56 by the hydraulic plunger 52. The upper and lower mold sections 56 and 58 can be heated by conducting hot liquid through suitable passages in the mold sections. Similarly, the upper and lower mold sections can be cooled by conducting cold liquid through the passages in the mold sections.

When the press assembly 40 is to be utilized to form a solid one-piece composite article utilizing the particulate silicone based material previously described herein in association with FIGS. 1–4, the recess 62 in the lower mold section 58 is at least partially filled with the silicone based material. At this time, the silicone based material is at ambient temperature (about 70° F.). The hydraulic plunger 52 is then actuated to raise the lower mold section 58 so that the projection 60 on the upper mold section 56 enters the recess 62 and applies force against the silicone based material in the recess 62. The force applied against the silicone based material in the recess 62 will compress the particulate silicone based material in the recess 62 and reduce the volume occupied by the particulate silicone based material.

The particulate silicone based material in the recess 62 may be compressed with any desired pressure. Thus, upper and lower mold sections 56 and 58 may apply a very low pressure against the powdered silicone based material in the recess 62. Alternatively, the upper and lower mold sections 56 and 58 may apply a relatively high pressure against the powdered silicone based material in the recess 62. For example, the upper and lower mold sections 56 and 58 may apply a pressure of ten pounds per square inch (10 psi) against the silicone based material in the recess 62. Alternatively, the upper and lower mold sections 56 and 58 may apply a pressure of at least one thousand pounds per square inch (1,000 psi) against the silicone based material in the recess 62.

Once the silicone based material has been compressed in the recess 62, the upper and lower mold sections 56 and 58 are heated. This heat is conducted to the silicone based material in the mold cavity 64 formed between the upper and lower mold sections. The silicone based material in the mold cavity 64 is heated to a temperature between about 200° F. and about 400° F. In one specific instance, the silicone based material was heated to a temperature of approximately 300° F. After the silicone based material in the mold cavity 64 has been heated, the upper and lower mold sections 56 and 58 are cooled. This results in the formation of a solid one-piece composite article in the mold cavity 64.

The lower mold section 58 is then moved downward away from the upper mold section 56. The one-piece composite article can be removed from the recess 62 in the lower mold section 58. When the one-piece composite article is removed from the recess 62 it is still very warm, that is, at a temperature of between 120° F. and 200° F. At this time, plastic deformation of the one-piece composite article can be readily accomplished by the application of relatively small forces to the one-piece composite article. As the one-piece composite cools to ambient temperature (approximately 70° F.), the one-piece article becomes rigid and cannot be plastically deformed.

The solid composite article retains its desired configuration upon being heated to a temperature of at least about 3000° F. and the applying of force against the solid composite article. The solid composite article does not melt or thermally decompose when heated to a temperature of at least 3000° F. It is contemplated that the solid one-piece composite article can be formed with the press assembly 40 to have any one of many configurations suitable for any one of many different uses.

The greater the pressure which is applied against the silicone based material in the mold cavity 64 by the upper and lower mold sections 56 and 58, the finer are the particles which become interconnected to form the one-piece composite article and the smoother is the surface of the one-piece article. Thus, if relatively little pressure is applied against the silicone based material in the mold cavity 64, the one-piece article will be formed with relatively large particles and may have a granular appearing surface. Such a one-piece composite article is sufficiently porous to enable a liquid (water) to pass through the one-piece article.

However, if a relatively large pressure is applied to the silicone based material in the mold cavity 64, the one-piece composite article is formed with little or no growth of the particulate which forms the silicone based material. This results in the composite one-piece article having a smooth, glassy surface. The one-piece composite article which is formed in this manner is not porous and liquids will not flow through the article. Thus, by increasing the pressure applied against the silicone based material, the density of the one-piece composite article and the smoothness of the surface of the one-piece composite article can be increased.

In the foregoing explanation, the silicone based material was placed into the recess 62 in the lower mold section 58 and then heated. However, it is contemplated that the silicone based material could be heated, to a temperature of between about 200° F. and about 400° F. and then placed in the lower mold section 58. If this was done, the lower mold section 58 may also be heated to a temperature of between about 200° F. and about 400° F. to inhibit interconnection of particles of the silicone based material prior to closing of the upper and lower mold sections 56 and 58.

Injection Molding

Figure 6:
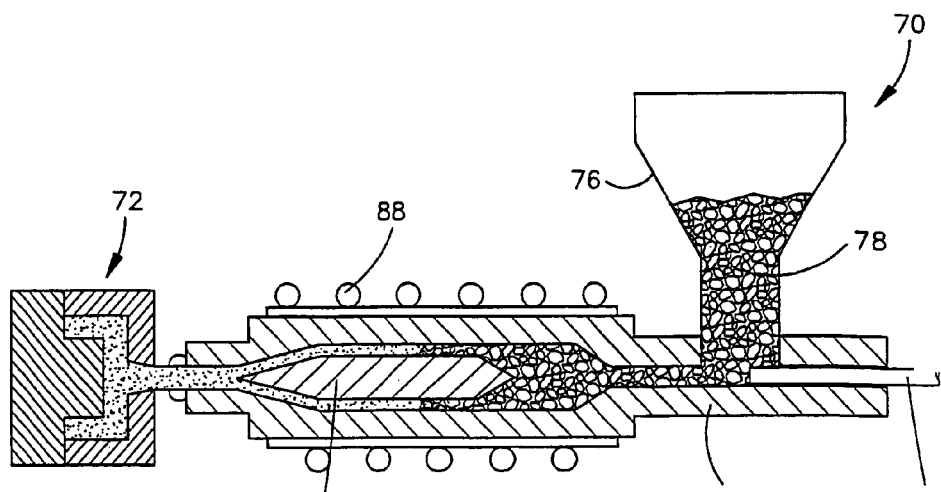
FIG. 6 is a schematic illustration of a ram fed injection molding machine for shaping silicone based material in accordance with another feature of the present invention.

The press assembly 40 is illustrative of many known compression molding assemblies which may be utilized to form the silicone based material into a composite article having a desired configuration. A ram fed injection molding machine 70 of FIG. 6 is illustrative of many known types of injection molding machines which may be utilized in association with a mold assembly 72 to shape the silicone based material to form a composite article of a desired configuration. Known ram fed injection molding machines 70 are capable of injecting the silicone based material at pressures of one thousand pounds per square inch (1,000 psi) or more.

The ram fed injection molding machine 70 includes a hopper 76 which is filled with silicone based material 78. Although the silicone based material 78 has been illustrated schematically in FIG. 6 as having a relatively porous grain, it should be understood that the silicone based material 78 is fine grain and has a consistency similar to the consistency of confectionary sugar. The silicone based material 78 is formed in the manner previously described herein in association with FIGS. 1–4.

The ram fed injection molding machine 70 includes a ram 82 which is reciprocated axially relative to a tubular barrel 84 to force the silicone based material 78 along the barrel, past a torpedo or guide 86 and into the mold assembly 72 in a known manner. A heater 88 is provided in association with the barrel 84 to heat the silicone based material 78 as it moves along the barrel and is injected into the mold assembly 72. The heater 88 heats the silicone based material 78 to a temperature between about 200° F. and about 400° F. The mold assembly 72 may, itself, be heated. However, when the silicone based material is heated to a temperature between about 200° F. and 400° F. in the molding machine 70, the silicone based material may be injected into a mold 72 which is at ambient temperature.

It should be understood that the powdered silicone based material 78 could be moved along the barrel 84 by the ram 82 and injected into the mold assembly 72 without being heated. The powdered silicone based material 78 may be injected into the mold assembly at a pressure of 1,0o00 pounds per square inch or more. The mold assembly 72, once it is packed with the silicone based material 78, could be heated to a temperature between about 200° F. and about 400° F. This would result in a corresponding heating of the silicone based material in the mold assembly 72.

Extruding

In the embodiments illustrated in FIGS. 5 and 6, the silicone based material is been placed in a mold cavity to form a one-piece composite article having a configuration corresponding to the configuration of the mold cavity. In the embodiment illustrated in FIG. 7, the silicone based material is extruded to form a one-piece composite article with a desired configuration.

When the silicone based material of the present invention is to be extruded, the silicone based material is placed, in powder form, in a feed hopper 100 of a screw type extruder 102. The silicone based material placed in the feed hopper 100 is formed in the manner previously described herein in association with FIGS. 1–4.

The screw type extruder 102 includes a barrel 104 in which an axially rotatable screw 106 is disposed. Cooling passages 108 may be provided in the barrel 104 of the extruder 102. A heater 110 extends around the outside of the barrel 104 and is effective to heat the silicone based material as it is moved along the barrel by the screw 106. A die 114 is provided at an outlet from the barrel 104 to impart a final configuration to the extruded silicone based material. A heater 116 is provided around the die 114.

The powdered silicone based material is initially placed in the feed hopper 100. Rotation of the screw 106 moves the powder toward the left (as viewed in FIG. 7). As the powder is moved toward the left, it is heated to a temperature of between about 200° F. and about 400° F. The heated silicone based material is forced through the die 114 to form a continuous elongated one-piece composite article having a cross sectional configuration corresponding to the cross sectional configuration of the die. When the one-piece article cools to ambient temperature, the one-piece extruded composite article resists melting and thermal decomposition when heated to temperatures of at least 3000° F. The elongated one-piece composite material extruded from the die 114 may be cut into desired lengths.

It should be understood that the screw type extruder 102, which has been illustrated schematically in FIG. 7, is representative of many different known types of extruders which could be utilized to impart a desired shape to the silicone based material.

Covering

In the embodiments of FIGS. 5–7, the silicone based material is shaped, using a die or mold, to form a one-piece article. In the embodiment of the invention illustrated in FIG. 8, the silicone based material is applied as a covering to a base member 122. The silicone based material which is used as a covering is formed in the manner previously described herein in association with FIGS. 1–4.

The illustrated base member 122 is a blade which will be a rotating component of a turbine engine. Rather than being applied to a rotating component, the covering could be applied to a base member which is a stationary component of a turbine engine. Thus, the base member 122 could be a portion of a turbine engine housing which is exposed to hot exhaust gases.

It should be understood that the base member 122 could be an article or an assembly which is intended for use in an environment other than a turbine engine. For example, the base member 122 could be a ladle or other item which is exposed to hot or molten metal. It should be understood that that the base member 122 could be any desired article or assembly to which a heat resistant and/or electrically insulating covering is to be applied.

In the embodiment illustrated in FIG. 8, a known electrostatic spray apparatus 126 is utilized to apply the covering to the base member 122. The known electrostatic spray apparatus 126 includes a powder spray gun 128. A nozzle assembly 130 is connected with the spray gun 128 and directs a flow of fluid (air) entrained powder toward the base member 122. In addition to the nozzle assembly 130, the electrostatic spray apparatus 126 includes a venturi-type powder pump 134 which is connected with a powder feed container 136. The powder feed container holds the silicone based material formed in the manner previously explained. Upon actuation of a solenoid valve 138, air is conducted through the venturi type powder pump 134 and powder from the feed container 136 is entrained in the flow of air. An amplifier 142 is provided downstream from the powder pump 134. A diffuser 144 is provided downstream from the amplifier 142.

From the diffuser 144, the flow of air with powder entrained therein enters an electrostatic charging unit in the powder spray gun 128. A diverter assembly 148 is provided between the nozzle assembly 130 and the electrostatic charging unit in the spray gun 128. The diverter assembly 148 selectively interrupts the flow of powder to the nozzle assembly 130 to sharply define the trailing end of a pulse or puff of the powdered silicone based material to be applied to the base member 122.

It is contemplated that the electrostatic spray apparatus 126 may have any one of many different known constructions. The specific electrostatic spray apparatus 126 illustrated in FIG. 8 has the same construction as is disclosed in U.S. Pat. No. 5,520,735. Although the electrostatic spray apparatus 126 is stationary and the base member 122 is moved past the electrostatic spray apparatus, it is contemplated that the electrostatic spray apparatus could be a portable, handheld spray gun which is moved relative to the base member 122.

The flow of air entrained powdered silicone based material from the spray nozzle 130 is electrostatically charged. The base member 122 has an electrostatic charge which is opposite from the electrostatic charge on the particles of particles in the flow of air entrained powder from the nozzle assembly 130. Therefore, the particles of silicone based material adhere to the surface of the base member 122 and provide a covering over the surface of the base member 122.

With the illustrated electrostatic spray apparatus 126, the particles of powder in the flow of air entrained silicone based material from the nozzle assembly 130 is at ambient temperature (approximately 70° F.). Therefore, once the powder of silicone based material has been electrostatically applied to the base member 122, the base member and the covering of powdered silicone based material is heated to a temperature between about 200° F. and about 400° F. When the base member 122 and covering of silicone based material in powder form over the base member are heated, the particles of the silicone based material become interconnected and form a solid composite.

The base member 122 and the covering of silicone based material over the base member are then cooled to ambient temperature (approximately 70° F.). This results in the forming of a rigid one-piece covering of the silicone based material over the base member 122. This covering forms a one-piece composite article which is resistant to melting and thermal decomposition when heated to temperatures of at least 3000° F.

In the embodiment of FIG. 8, the one-piece covering of silicone based material is applied to the base member 122 using an electrostatic spray apparatus 126. However, it is contemplated that the solid composite covering of silicone based material could be applied to the base member 122 in a different manner if desired. For example, the base member 122 could be wetted and plunged into a container of the powdered silicone based material. Upon withdrawal of the base member from the container of silicone based material, a covering of particles of the powdered silicone based material would adhere to the base member. By heating the base member and the silicone based material to a temperature of between about 200° F. and about 400° F., the particles of the silicone base covering would become interconnected and form a rigid covering which is resistant to melting and thermal decomposition when heated to temperatures of at least about 3000° F.

A covering of the powdered silicone based material could be applied by forming separate elements, such as tiles or sheets, and connecting them with a base member. The separate elements could be connected with the base member by adhesive and/or mechanical fasteners. If desired, a slurry of the silicone based material could be applied to a base member with a brush and/or roller.

EXAMPLE

This example illustrates the preparation of a shaped article in accordance with the present invention. The article may have any desired configuration.

About 950 grams of MC550BK1 was obtained. MC550BK1 is a silicone molding compound commercially available from GE Silicones of Waterford, N.Y. in the form of black particles having an average particle size similar to that of the granular particle used in roofing shingles. MC550BK1 includes, by weight of the MC550BK1, about 60% to about 80% amorphous fused silica powder, about 10% to about 30% fibrous glass, about 1% to about 5% amorphous silica, and about 10% to about 30% of siloxanes and silicones, including dimethyl polymers with phenyl silsequioxanes. The MC550BK1 was transferred to a conventional grinder and ground until the MC550BK1 had a consistency similar to that of baby powder. The powdered MC550BK1 was transferred from the grinder to a conventional mixing apparatus.

About 50 grams of TRIPLUS was added to and mixed with the powdered MC550BK1 in the mixing apparatus. TRIPLUS is a solventless liquid silicone resin blend system that is commercially available from GE Silicones of Waterford, N.Y. TRIPLUS includes a dimethylpolysiloxane silanol (TPR 178) and a methylsiloxane resin (TPR 179). The weight ratio of TPR 178 to TPR 179 in the TRIPLUS is about 1:1.

The liquid TRIPLUS mixed with the MC550BK1 wetted the powdered MC550BK1 and was absorbed by the powdered MC550BK1. Once the liquid TRIPLUS was absorbed by MC550BK1, 1 gram of a zirconium catalyst powder was added to added to and mixed with the TRIPLUS and the M550BK1.

About 350 grams of a filler material that includes talc filler with the tradename CANTAL and chopped fiberglass strands (8 microns in diameter by ¼ inch in length) was then added to and mixed with the mixture of MC550BK1, TRIPLUS, and zirconium catalyst.

The combined mixtures were transferred to a rotary blender and blended until the average particle size and the consistency of the mixture is similar to that of confectionary sugar.

A container was obtained and a pattern was placed in the container. The powdered silicone based material was poured over the pattern until the highest point of the pattern was covered by about ½ inch of the particulate silicone based material.

The container was placed in a conventional oven that that had an oven temperature of about 300° F. The particles of the silicone based material became interconnected and formed a one-piece article (i.e., about 1 hour). The container and the one-piece composite article formed by the silicone based material were removed from the oven and allowed to cool to ambient temperature (i.e., about 75° F.). Upon being cooled to ambient temperature, the one-piece article was a rigid solid composite having the consistency of concrete. The container and the article defining pattern were separated from the one-piece solid composite article.

The one-piece composite article so formed had a smooth surface with no micro-irregularities. The one-piece composite article was heated in an oven to a temperature of at least about 3000° F. Upon being heated to a temperature of at least about 3000° F. the one-piece composite article was rigid and did not melt or thermally decompose. However, filler material in the one-piece composite article did burn.

Moreover, the one-piece composite article was exposed to a flame having a temperature of about 5000° F. The area of the one-piece composite article exposed to the flame did not melt or thermally decompose. Additionally, upon cooling the area of the one-piece composite article exposed to the flame exhibited no evidence of thermal shock, such as stress cracking.

It should be understood that the particulate silicone based material of the present invention could be utilized in many different ways to form many different types of articles. Thus, the silicone based material of the present invention may be used to form a mold and/or a core which is utilized to shape articles which may be formed of any desired material, such as mold material or metal.

The particulate silicone based material of the present invention may be shaped utilizing a mold, as illustrated in FIGS. 5 and 6. The particulate silicone based material of the present invention may be extruded, as illustrated in FIG. 7.

The particulate silicone based material of the present invention may be used as a covering which is applied in any one of many different ways, including the apparatus of FIG. 8.

Articles Containing Cavities

In the embodiments of the invention described in conjunction with FIGS. 1–8, a solid one-piece article is formed using the particulate silicone based material. The particulate silicone based material forming this article has a density of approximate 1.9 grams/cubic centimeter. In the embodiment illustrated in FIG. 9, the density of the article is reduced to approximately 1.2 grams/cubic centimeter by mixing small hollow elements with the particulate silicone based material. It should be understood that the density of the one-piece article of FIG. 9 may be varied by varying the quantity of small hollow elements which are mixed with the particulate silicone based material.

The silicone based material is prepared in the same manner as previously described herein in conjunction with FIGS. 1–8. As was previously mentioned, the silicone based material comprises a silicone molding compound, a silicone resin and a catalyst. The silicone molding compound includes silica and a silsesquioxane polymer. The molding compound comprises, by weight of the silicone molding compounding, about 60% to about 80% fused silica, about 10% to about 30% fibrous glass, about 1% to about 5% amorphous silica, and about 10% to about 30% of a dimethyl silicone with phenyl silsequioxane.

The silicone resin includes a mixture of dimethylpolysiloxane silanol and a methyl siloxane resin. This mixture has a weight ratio of dimethylpolysiloxane silanol to methyl siloxane resin of about 1:2 to about 2:1.

The catalyst is selected from a group consisting of zirconium, zinc octoate, cobalt octoate, iron octoate and stannous octoate. In one specific instance, the catalyst was zirconium octoate. However, it is contemplated that zinc octoate or other catalysts may be utilized.

One specific silicone based material was formed of about 90% to about 98% by weight of the silicone molding compound. This specific silicone based material contained about 2% to about 10% by weight of the silicone resin. This particular silicone based material contained up to about 0.5% by weight of the catalyst. The weight percentages are expressed on the combined weight of the silicone molding compound, the silicone resin, and the catalyst. The silicone based material also included a fibrous filler material.

In accordance with a feature of this embodiment of the invention, small hollow elements are mixed with the particulate silicone based material. Although many different types of small hollow elements may be utilized, in one specific instance, hollow glass spheres were mixed with the particulate silicone based material. It is contemplated that the small hollow elements may be bubbles or microspheres and have a particle size, by volume, of between 15 and 135 microns. Of course, either larger or smaller hollow spherical elements may be utilized if desired. It should be understood that the hollow elements may be formed of materials other than glass. It should also be understood that the small hollow elements may have a configuration other than spherical.

The mixture of particulate silicone based material and small hollow spheres may be referred to as a foam. Thus, the mixture of the particulate silicone based material and small hollow spheres is a tightly packed aggregation of bubbles separated from each other. The mixture of the small hollow spheres and the particulate silicone based material forms a free flowing powder. The free flowing powder, that is, the foam, may be shaped by any of the methods previously discussed in conjunction with FIGS. 1–8. Of course, other methods of shaping the foam formed by the mixture of particulate silicone based material and small hollow spheres may be utilized if desired.

In one specific instance, the small hollow elements were glass microspheres having a particle size of between 15 and 85 microns. A substantial portion of the microspheres had a median particle size of approximately 40 microns. These microspheres were obtained from 3M Corporation which has a place of business at St. Paul, Minn. under the designation of S38 Scotchlite (trademark) glass bubbles. These specific glass bubbles have an isostatic crush strength (90% survival) of approximately 4000 psi and a density of 0.38 grams per cubic centimeter. However, it should be understood that hollow elements of a different size, configuration, and composition may be utilized if desired.

It is contemplated that the small hollow elements may have a construction which results in expansion when they are heated. For example, the small hollow elements may be microspheres having a polymer shell which encapsulates a gas. When the gas inside the shell is heated, it increases its pressure and the thermoplastic shell softens. This results in an increase in the volume of the microspheres.

Either expanded or unexpanded microspheres may be mixed with the particulate silicone based material. Microspheres which expand when heated are commercially available from Expancel. Expancel is part of Casco Products which is a business unit of the Dutch company Akzo Nobel. Expancel has a place of business in Stockviksverken, Sweden and in Duluth, Ga. in the United States.

It should be understood that the small hollow elements may have a construction which is different that the specific construction set forth herein. For example, the small hollow elements may be larger than the microspheres previously described. Of course the small hollow elements may have a configuration which is not spherical.

It is contemplated that rather than utilizing small hollow elements to reduce the density of the particulate silicone based material, the density of the particulate silicone based material may be reduced in other ways. For example, light weight filler materials may be mixed with the particulate silicone based material and/or gas may be blown into the silicone based material. Rather than utilizing small hollow elements, particles of a material which is absorbed by or driven off from the particulate silicone based material when it is heated to a temperature of between about 200° F. and 400° F. may be utilized to form cavities in the particulate silicone based material to reduce the density of the particulate silicone based material.

The mixture of the particulate silicone based material and small hollow elements may be shaped in a mold in the manner previously described in conjunction with FIGS. 1–5 herein. When an article is to be formed by using a mold, silicone based material is prepared by mixing silicone molding compound (MC550), silicone resin, catalyst, and filler, if utilized, to form a dry free flowing particulate silicone based material. The small hollow elements are mixed with the particulate silicone based material. The resulting mixture is also dry and free flowing.

The mixture has the same general mechanical characteristics as the particulate silicone based material. However, due to the presence of the small hollow elements, the mixture may be referred to as a foam. In one specific instance, the mixture consisted (by volume) of 50% particulate silicone based material and 50% small hollow spheres. Of course, the mixture could contain either a larger or smaller percentage of small hollow spheres if desired. The small hollow spheres were the previously referred to S38 hollow glass microspheres which are commercially available from 3M Corporation.

The mixture of the particulate silicone based material and small hollow elements is placed in a container or mold. The mixture of the particulate silicone based material and small hollow elements may be transferred to the container by pouring the free flowing powder forming the silicone based material and the hollow elements into the container or by injecting the mixture into the container. The amount of the mixture which is transferred to the container may vary depending upon the desired construction of a solid article to be formed.

Once the mixture of particulate silicone based material and small hollow elements has been transferred to the container or mold, pressure may be applied against the mixture to compact the mixture. The greater the pressure utilized to pack the mixture into the container or mold, the finer will be the particles formed by the particulate silicone based material around the small hollow elements. Thus, if the mixture is merely poured into the container, without packing of the mixture, relatively course particles are formed and interconnected upon heating of the particulate silicone based material. If the particulate silicone based material is firmly packed into the container or mold, relatively fine particles are formed and interconnected upon heating of the particulate silicone based material.

The interconnected particles of the silicone based material encloses and holds the small hollow elements. The container, holding the mixture of particulate silicone based material and small hollow elements is placed in a conventional heating apparatus, such as an oven. The container and the mixture of particulate silicone based material and small hollow elements are heated to a temperature of about 200° F. to about 400° F. If desired, pressure may be applied against the mixture as it is heated.

Figure 9:
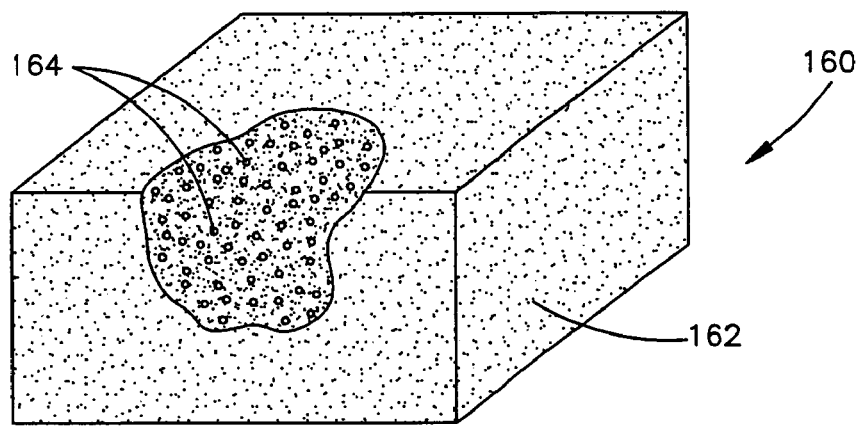
FIG. 9 is a schematic illustration of a shaped article formed of a mixture of the silicone based material and small hollow spheres.

After being at a temperature of about 200° F. and 400° F. for a period of time, for example about thirty minutes, the container with the silicone based material extending around the small hollow elements is removed from the oven and allowed to cool. Upon cooling to ambient (room) temperature (70° F.), the silicone based material forms a rigid matrix which encloses and securely grips the small hollow elements. The container and the rigid composite, formed by the mixture of silicone based material and small hollow elements, are then separated. This results in the forming of a cast rigid solid body 160 (FIG. 9). Although the body 160 has been illustrated in FIG. 9 as having a rectangular configuration, it is contemplated that the solid body 160 may be shaped to any desired configuration, for example, the configuration illustrated in FIG. 3.

The solid body 160 has a rigid matrix 162 which encloses cavities 164 formed by the small hollow elements. The specific small hollow elements utilized to form cavities in the solid body 160 are the previously referred to glass microspheres or bubbles which are commercially available from 3M Corporation. Due to the bubbles or cavities 164, the solid body 160 may be referred to as a rigid foam.

The solid body 160 is resistant to melting and thermal decomposition when heated to temperatures of at least 3000° F. The rigid body 160 does not deflect or otherwise deform when it is heated to a temperature of at least about 3000° F. and force is applied against the rigid body. There is no substantial deformation of the solid body 160 when it is heated to a temperature of 5000° F. and force is applied against the solid body.

Prior to cooling of the solid body 160 to ambient temperature, the solid body may be plastically deformed by the application of relatively small forces to the solid body. Thus, when the solid body 160 is in the container or mold in which it is shaped or after it has been removed from the container or mold and is still relatively warm, that is at a temperature between 120° F. and 200° F., plastic deformation of the composite solid body 160 can be accomplished by the application of relatively small forces to the body.

The heating of the mixture of particulate silicone based material and small spheres to a temperature of between 200° F. and 400° F. does not effect the glass microspheres which were utilized to form the cavities 164 in the solid body 160. Therefore, when the solid body 160 is removed from the container or mold in which it was shaped, the small hollow spheres are of the same size and configuration as when they were originally mixed with the particulate silicone based material. However, it is contemplated that the small hollow spheres may be formed of a material which allows gas to expand the spheres when the spheres are heated to a temperature of about 200° F. to about 400° F. If desired, the small hollow elements may be formed of a material which is absorbed by or driven off from the silicone based material when the small hollow elements and silicone based material are heated to a temperature of about 200° F. to 400° F.

The mixture of particulate silicone based material and small hollow elements may be molded in the manner previously described in conjunction with the press assembly 40 illustrated in FIG. 5. Alternatively, the mixture of particulate silicone based material and small hollow elements may be shaped with an injection molding machine similar to the injection molding machine 70 of FIG. 6. If desired, the mixture of particulate silicone based material and small hollow elements may be extrusion molded with an extruder having a construction similar to the construction illustrated in FIG. 7.

Rather than being shaped utilizing a die or mold in a manner similar to that described in conjunction with FIGS. 5–7 herein, the mixture of particulate silicone based material and small hollow elements may be applied as a covering to a base member. For example, the mixture of particulate silicone based material and small hollow elements may be applied as a covering to either a rotating or a stationary component of a turbine engine. Of course, the mixture of particulate silicone based material and small hollow elements may be applied to base members which are intended for use in an environment other than a turbine engine.

A covering of a mixture of the particulate silicone based material and small hollow elements may be applied to a base member utilizing an electrostatic spray apparatus similar to the electrostatic spray apparatus 126 of FIG. 8. Of course, the covering may be applied to the base member in a different manner if desired. For example, the base member may be wetted and then plunged into a container holding a mixture of particulate silicone base material and small hollow elements.

A covering formed by the mixture of particulate silicone based material and small hollow elements may be applied by forming separate elements, such as tiles or sheets and connecting them with a base member. The separate elements may be connected with a base member by adhesive or mechanical fasteners. If desired, a slurry of the mixture of particulate silicone material and small hollow elements may be applied to a base member with a brush and/or roller.

It is contemplated that the mixture of particulate silicone based material and small hollow elements may be utilized to form many different types of articles. For example, the mixture may be utilized to form components of an exhaust system for an engine or components of the engine itself. The mixture of particulate silicone based material and small hollow elements may be used to form structural parts, such as a frame, or door, or other component of an aircraft or rocket.

When the small hollow elements are mixed with the particulate silicone based material to form a rigid foam, the resulting article is relatively light in weight and may have a density of approximately 1.2 grams/cubic centimeter depending upon the volumetric ratio of the small hollow elements to the particulate silicone based material. It is believed that the relatively light weight of the resulting rigid foam will make it particularly advantageous for use in an aircraft or a rocket. The mixture of particulate silicone based material and hollow elements may be utilized to form components of static structures, such as panels of a building or furnace.

Due to the resistance of an article formed by the mixture of particulate silicone based material and small hollow elements to melting and thermal decomposition when heated to temperatures of 3000° F. and more, it is believed that the material may be utilized to contain energy beams, such as laser beams. The rigid foam formed by the mixture of silicone based material and small hollow elements may be utilized to line nozzles from which gases and/or flames are directed at very high temperatures.

The rigid foam formed by the mixture of silicone based material and small hollow elements has very good heat insulation characteristics. The superior heat insulation characteristics of the rigid foam results from the cavities which are formed by the small hollow elements. Therefore, heat shields and other articles exposed to high temperatures may advantageously be formed of the rigid foam made from the mixture of particulate silicone based material and the small hollow elements. The excellent heat insulation characteristics and resistance to melting and thermal decomposition of an article formed by the mixture of the particulate silicone based material and small hollow elements may be utilized in a heat shield on the outside of an aircraft or a vehicle which is to move from outer space into the earth's atmosphere. It should be understood that the foregoing specific uses for articles formed by the mixture of particulate silicone based material and small hollow elements are merely a small number of examples of many different articles which may be formed using the mixture.

Layered Article

It is contemplated that is may be desired to form the solid body 160 of FIG. 9 with an outer layer which is free of cavities formed by small hollow elements. Thus, the solid body 160 may be enclosed by one or more layers formed by particulate silicone based material which is free of the small hollow elements. This would result in the solid body 160 of FIG. 9 having a layered construction.

Figure 10:
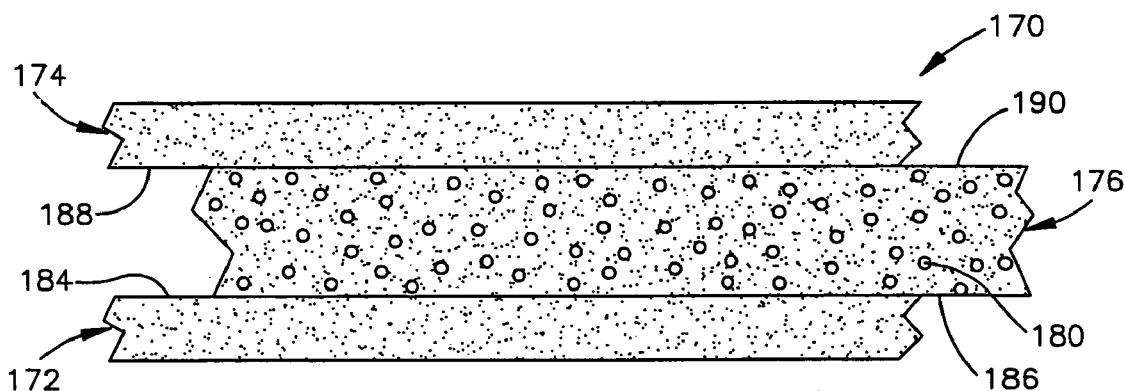
FIG. 10 is a schematic sectional view of a heat resistant body having upper and lower layers formed of the silicone based material and an intermediate layer formed of a mixture of the silicone based material and small hollow spheres.

A solid layered body is illustrated in FIG. 10. The layered body 170 includes a lower layer 172 and an upper layer 174. The upper and lower layers 172 and 174 are formed of a particulate silicone based material which is free of small hollow elements. Therefore, the lower and upper layers 172 and 174 are free of cavities, similar to the cavities 164 of FIG. 9. The lower and upper layers 172 and 174 are relatively dense, compared to the solid body 160 of FIG. 9.

A center or intermediate layer 176 is disposed between the lower and upper layers 172 and 174. The center layer 176 is formed by a mixture of particulate silicone based material and small hollow elements. Therefore, the center layer 176 has cavities 180 which are formed by the small hollow elements in the same manner as the cavities 164 of FIG. 9. In one specific embodiment of the center layer 176, the cavities 180 are formed by hollow glass microspheres or bubbles. However, the small hollow elements may have a configuration which is not spherical and may be formed of a material other than glass.

The lower and upper layers 172 and 174 are securely connected to the center layer 176. Thus, the particulate silicone based material of the lower and upper layers 172 and 174 connects with the particulate silicone based material of the center layer 176 to form a solid unitary composite article. The lower layer 172 has an upper side surface 184 which bonds to the lower side surface 186 of the center layer 176. Similarly, the upper layer 174 has a lower side surface 188 which bonds to an upper side surface 190 of the center layer 176. The resulting one-piece article has a laminated construction with relatively dense lower and upper layers 172 and 174 disposed on opposite sides of a center layer 176 having a relatively low density.

In one specific instance, the lower and upper layers 172 and 174 had a density of approximately 1.9 grams/cubic centimeter while the center layer 176 had a density of approximately 1.2 grams/cubic centimeter. In this specific embodiment, the cavities 180 were formed by small hollow spheres which are commercially available from 3M Corporation under the designation S38 hollow glass microspheres. However, it should be understood that the layers 172, 174 and 176 may have densities which are different than the foregoing densities. Of course, the density of the center layer 176 will depend upon the volumetric ratio of small hollow spheres to particulate silicone based material used to form the center layer.

When a density of approximately 1.2 grams/cubic centimeter is desired, the volumetric ratio of small hollow spheres to particulate silicone based material may be one-to-one. Thus, on a volumetric basis, fifty percent of the center layer 176 may be formed by particulate silicone based material while the other fifty percent of the center layer may be formed of small hollow spheres.

The particulate silicone based material in the lower and upper layers 172 and 174 bonds to the particulate silicone material of the center layer 176 when the material forming the layered body 170 is heated to a temperature which is between about 200° F. and about 400° F. When the material forming the layered body 170 has been heated to a temperature about 200° F. and about 400° F. there is an agglomeration of fine particles of the silicone based material to form coarse particles. This results in the relatively fine particles of silicone based material in the lower layer 172 and upper layer 174 interconnecting with particles of silicone based material disposed in the center layer 176.

When the layered body 170 is to be formed, a container or mold 196 (FIG. 11) may be utilized. The container 196 has a cavity 198 with a configuration corresponding to the desired configuration of the layered body 170. Particulate silicone based material which is free of small hollow elements bodies is prepared in the same manner as was previously described in conjunction with the embodiments of the invention illustrated in FIGS. 1–8. The free flowing particulate silicone based material is poured into the cavity 198 in the manner illustrated schematically by an arrow 202 in FIG. 11. The particulate silicone based material moves into engagement with and covers a bottom wall 204 of the container 196. The particulate silicone based material overlies the bottom wall 204 of the container 196 and forms the lower layer 172 of the layered body 170.

Once the particulate silicone based material which is to form the bottom layer 172 of the layered body 170 has been poured into the container or mold 196, pressure may be applied against the particulate silicone based material to compact the particulate silicone material. If desired, a press assembly, similar to the press assembly 40 of FIG. 5, may be utilized to apply pressure against the particulate silicone based material forming the lower layer 172. To compact the particulate silicone based material of the lower layer 172, a hydraulic plunger may be actuated to apply a force against the particulate silicone based material while the material is at ambient temperature (about 70° F.).

The force applied against the particulate silicone based material in the container 196 reduces the volume occupied by the silicone based material. Either a relatively low pressure or a relatively high pressure may be applied against the particulate silicone based material forming the lower layer 172 in the container 196. For example, a plunger may be actuated to apply a force of approximately ten pounds per square inch (10 psi) against the particulate silicone based material in the lower layer 172. Alternatively, a plunger may apply a pressure of at least one thousand pounds per square inch (1,000 psi) against the particulate silicone based material in the lower layer 172. However, if desired, the step of applying pressure against the lower layer 172 of particulate silicone based material may be omitted.

Figure 11:
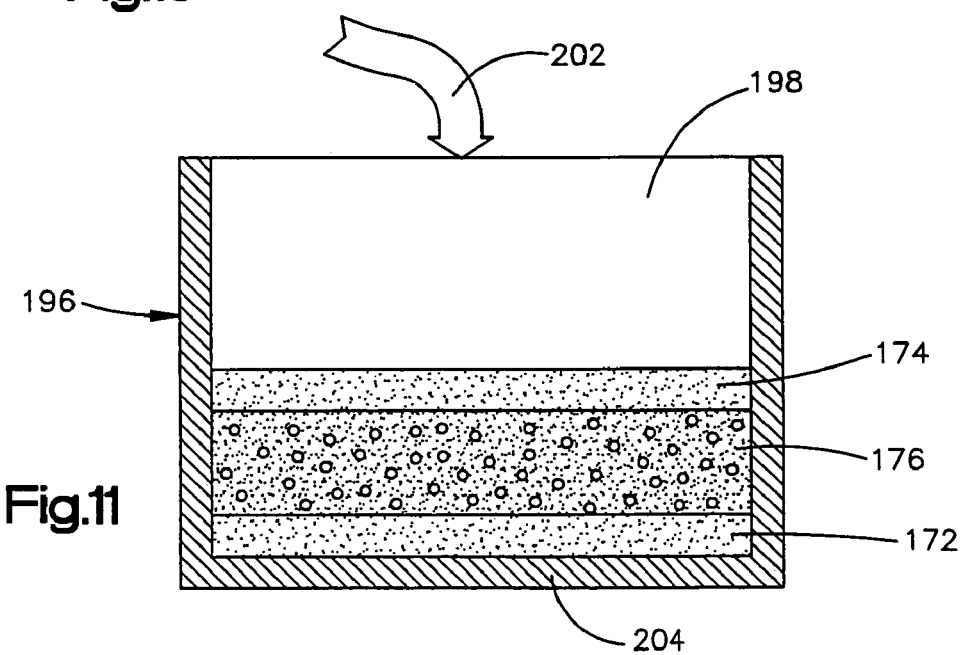
FIG. 11 is a schematic illustration of a mold which is utilized to form the layered body of FIG. 10.

After the lower layer 172 of silicone based material has been formed in the container 196, a mixture of the particulate silicone based material and small hollow elements is poured into the container, in the manner indicated by the arrow 202 in FIG. 11. In this specific case, the small hollow elements were small hollow spheres. The mixture of particulate silicone based material and small hollow spheres forms the center layer 176 of the layered body 170. The mixture which forms the center layer 176 is poured directly onto the lower layer 172.

Pressure may be applied against the mixture forming the center layer 176 to compact the material of the center layer 176. The pressure which is applied against the mixture of silicone based material and small hollow spheres forming the center layer 176 may be either relatively low or relatively high. For example, pressure of approximately ten pounds per square inch (10 psi) may be applied against the mixture of the particulate silicon based material and small hollow spheres forming the center layer 176. Alternatively, a pressure of approximately one thousand pounds per square inch (1,000 psi) may be applied against the mixture of the particulate silicon based material and the small hollow spheres forming the center layer 176. However, if desired, the application of pressure against the center layer 176 may be omitted.

Once the center layer 176 has been positioned in the container 196, with or without the application of pressure to the center layer, the particulate silicone based material forming the upper layer 174 is poured into the container, in the manner indicated by the arrow 202 in FIG. 11. The particulate silicone based material forming the upper layer 174 is free of small hollow elements and is deposited directly on the center layer 176.

The silicone based material of the upper layer 174 may be pressed against the center layer 176 and lower layer 172 with either a relatively small or a relatively large force. For example, a pressure of ten pounds per square inch (10 psi) may be applied against the particulate silicone based material in the upper layer 174. Alternatively, a pressure of at least one thousand pounds per square inch (1,000 psi) may be applied against the particulate silicone based material of the upper layer 174. If desired, the step of applying pressure against the particulate silicone base material forming the upper layer 174 may be omitted.

In the foregoing description, pressure was sequentially applied against each of the layers 172, 174 and 176 as they were poured into the container 196. However, pressure may be applied against only the last layer 174 to compress all three layers 172–176. Alternatively, the step of applying pressure against any of the layers 172–176 may be omitted.

Once the layers 172–176 have been formed in the container 196, the layers are heated. The layers are heated to a temperature between about 200° F. and about 400° F. For example, the layers 172–176 may be heated to a temperature of approximately 300° F. for a period of approximately thirty minutes. During heating of the layers 172–176, pressure can be maintained on the layers if desired.

During heating of the layers 172–176, it is believed that the relatively fine particles of the silicone based material agglomerate to form coarser particles. As the particle size is apparently increasing, the adjacent particles in the layers 172–176 are interconnected to form a unitary composite article having layers 172–176. Although it is believed that the fine particles of the silicone based material are interconnected to form coarser particles which are interconnected to form a solid unitary composite article having a plurality of layers, the fine particles of the silicone based material may be interconnecting without forming coarser particles. This is particularly true when the layers 172–176 have been compacted by the application of pressure to the layers.

When the layers 172–176 are at a temperature between 200° F. and about 400° F., the layers can be easily deformed plastically by the application of force to the layers. When the one-piece composite article formed by the layers 172–176 has been cooled to a temperature below 200° F. and above ambient temperature, the one-piece article can still be manually deformed to change the configuration of the article. As the layers 172–176 continue to cool, they become more resistant to plastic deformation.

The container 196 may have any desired configuration. For example, the bottom wall 204 of the container may be formed as a portion of a sphere or may have an arcuate configuration. The bottom wall 204 may have one or more hollow downward projections to form the lower layer 172 with one or more projections. Similarly, the bottom wall 204 may have one or more upward projections to form the bottom layer with recesses.

The lower layer 172 may be formed with a varying thickness. The thickness of the center layer 176 may be maintained uniform throughout the extent of the center layer even though the thickness of the lower layer 172 varies. Alternatively, the center layer 176 may have a thickness which varies in a manner which is different than the manner in which the thickness of the lower layer 172 varies. Similarly, the upper layer 174 may have a thickness which varies across the extent of the upper layer.

It is contemplated that the layered body 170 may be utilized for many different purposes. It is believed that the layered body will be particularly well adapted for use in environments where light weight is desired and/or resistance to heat transfer is desired. For example, the layered body 170 may be utilized as a heat deflector in an aircraft or other vehicle to deflect hot exhaust gases. The cavities in the center layer 176 of the layered body 170 retard the transfer of heat through the layered body 170. Therefore, the layered body 170 may be utilize to insulate relatively cool areas from relatively hot areas. For example, the layer 170 may be provided as a liner which retards heat transfer from hot gases which are exhausted from an engine or are present in a furnace.

Due to the relatively light weight of the layered body 170, it is contemplated that it may be utilized on the interior of an aircraft. For example, a passenger compartment in a commercial aircraft may be lined with the layered body 170. In the unlikely event of a fire in or adjacent to the passenger compartment, the layered body 170 would not burn and would not be a source of toxic gas. Of course, the layered body 170 may be utilized in other components inside of an aircraft, such as a door panel.

The layered body 170 can be shaped to have many different configurations. For example, the layered body 170 may be shaped to form a nose cone on a rocket or space vehicle. A relatively large sheet having the same construction as the layered body 170 may be formed to cover a large exposed surface area on a craft which is to travel from outer space into the earth's atmosphere. It should be understood that the foregoing are examples of only some of the many uses for the layered body 170. It is believed that the layered body may be utilized in many different environments where light weight, thermal insulation, resistance to melting, and/or resistance to thermal decomposition is desired.

Composite Article Containing Fiber

In embodiment of the invention illustrated in FIGS. 12–15, fibers are covered with the silicone based material. The silicone based material and fibers are heated to a temperature between 200° F. and 400° F. while the silicone based material at least partially covers the fibers. The silicone based material is cooled to form a solid body containing the fibers. The solid body is resistant to melting and thermal decomposition when heated to a temperature of at least 3000° F. When the silicone based material is applied to the fibers, the silicone based material may be in either a solid particulate form or a nonsolid form.

A solid body 220 (FIG. 12) includes a matrix 222 of silicone based material. Fibers 224 are disposed in the matrix 222. The fibers 224 reinforce the matrix 222. The fibers 224 may be either hollow or solid.

Figure 12:
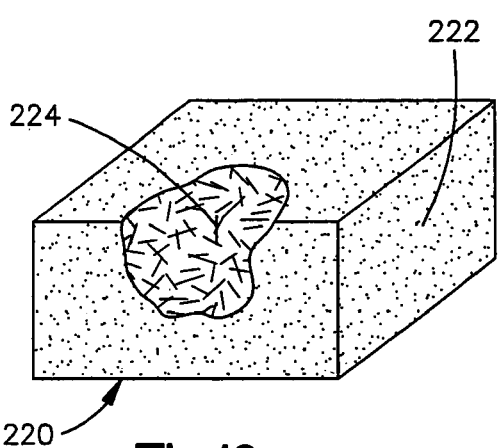
FIG. 12 is a schematic illustration of a shaped article having nonwoven fibers in a matrix of silicone based material.

In the embodiment of the invention illustrated in FIG. 12, the fibers 224 are unwoven and are randomly oriented fibers which are relatively long. However, the fibers 224 could be relatively short if desired. For example, the fibers 224 may be chopped fibers having a length of up to ½ inch long.

The long fibers 224 are formed of a material which does not react with the matrix 222 of silicone based material. The fibers 224 may be ceramic fibers or carbon fibers. It is believed that it may be desired to form the fibers 224 of quartz crystal or sapphire crystal. However, it should be understood that the fibers 224 may be formed of any desired material which is compatible with the matrix 222 of silicone based material and the environment in which the solid body 220 is to be utilized.

In the embodiment of the invention illustrated in FIG. 12, the long fibers 224 are unwoven randomly oriented fibers. However, it is contemplated that the fibers 224 may have an orientation which is not random. For example, the fibers 224 may be aligned or partially aligned with each other and extend lengthways along the solid body 220.

Figure 13:
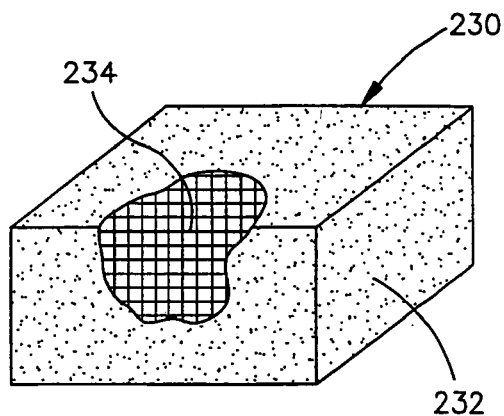
FIG. 13 is a schematic illustration generally similar to FIG. 12, of a shaped article having woven fibers in a matrix of silicone based material.

In the embodiment of the invention illustrated in FIG. 13, a solid body 230 includes a matrix 232 formed of a silicone based material and fibers 234. The long fibers 234 are woven to form one or more layers or sheets which are disposed within the matrix 232. A layer or sheet formed by the fibers 224 may extend parallel to an outer side surface of the solid body 230. A plurality of layers or sheets of woven fibers 224 may be disposed in a side-by-side relationship within the matrix 232. The fibers 234 may be either solid or hollow.

The matrices 222 and 232 are both formed of a silicone based material which is prepared by mixing a silicone molding compound, a silicon resin, and a catalyst. The silicone molding compound is a powder. The silicon resin is a liquid. The catalyst is a powder. The resulting dry particulate has an appearance similar to the appearance of dry, gray, flour with small lumps. The resulting dry particulate is a free flowing powder.

The silicone molding compound contains particles of silica and silsesquioxane polymer. The silicone molding compound, silicone resin and catalyst are the same as has been previously been described herein in conjunction with the embodiments of the invention illustrated in FIGS. 1–8.

The fibers 234 of FIG. 13 may be formed of any desired material which is compatible with the matrix 232 and the environment in which the solid body 230 is to be utilized. For example, the fibers 234 may be carbon fibers. Alternatively, the fibers 234 may be ceramic fibers, such as quartz crystal fibers or sapphire crystal fibers. The fibers 234 form a woven fabric. It should be understood that the nonwoven fibers 224 of FIG. 12 may form a nonwoven fabric.

When the solid body 220 (FIG. 12) or the solid body 230 (FIG. 13) is to be formed, the fibers 224 or the fibers 234 are covered with the particulate silicone based material. The particulate silicone based material is formed of molding compound, silicone resin, catalyst and a filler. The uniformly blended mixture is a dry particulate having a consistency of a very fine sand and is referred to herein as the silicone based material. The average particle of the a blended mixture forming the silicone based material may be reduced by grinding or milling the particles of the blended mixture. The particulate silicone based material so formed is a dry, free flowing powder and has the consistency of confectionary sugar with small lumps.

After the fibers 224 or 234 have been covered with the silicone based material, the fibers and silicone based material are heated to a temperature between about 200° F. and about 400° F. for a period of time. The discreet particles of the dry, free flowing powder become interconnected while they are at a temperature between 200° F. and 400° F. As this occurs, the particle size appears to increase. This apparent increase in particle size is believed to be the result of interconnection of relatively fine particles of the silicone based material. Thus, it is believed that there is an agglomeration of fine particles to form coarse particles when the silicone based material is heated to a temperature between about 200° F. and about 400° F.

As the particles of the silicone based material are agglomerated, they become interconnected around the fibers 224 or 234 to form a continuous matrix which and firmly grips and encloses the fibers. In the embodiment of the invention illustrated in FIGS. 12 and 13, the fibers 224 or 234 are completely encapsulated by the matrix 222 or 232. However, if desired, the fibers may be exposed at the surface of the enclosing matrix or extend from the surface of the enclosing matrix. It is believed that it may be desired to have the fibers 224 or 234 completely enclosed by the matrix 222 or 232 to prevent exposure of the fibers to the environment around the solid bodies 220 or 230.

Although it is believed that the fine particles of the silicone based material are interconnected to form coarser particles which are interconnected to form a solid unitary composite article, the fine particles may be interconnecting without forming coarser particles. When the fine particles of the silicone based material of the matrix 222 or 232 are tightly packed, it appears that the fine particles become interconnected with little or no increase in particle size.

When the one piece solid body 220 or 230 containing the fibers 224 or 234 is initially formed by interconnection of particles of the silicone based material of the matrix 222 or 232 and is still at a temperature between about 200° F. and about 400° F., the article can be easily deformed plastically by the application of force to the article. When the one-piece article is removed from a furnace and has cooled to a temperature below 200° F. and above ambient temperature, the one-piece article can be manually deformed to change the configuration of the article. At this time, the one-piece article is malleable and can be manually deformed to plastically change the configuration of the article in much the same manner as in which modeling clay is manually deformed. Of course, the fibers 224 or 234 may be deflected during deformation of the one-piece article.

As the one-piece article continues to cool, the article becomes more resistant to plastic deformation. When the one-piece solid body 220 or 230 has cooled to ambient temperature, the one-piece solid body is rigid. However, the one-piece solid body 220 or 230 does not become overly brittle as it becomes rigid. The fibers 224 or 234 in the one-piece solid body 220 or 230, reinforce the solid body.

The fibers 224 or 234 may be covered with the particulate silicone based material, which is used to form the matrices 222 or 232, in many different ways. For example, the fibers 224 (FIG. 12) may be placed in a container and the particulate silicone based material previously described herein in conjunction with the embodiments of the invention illustrated in FIGS. 1–8, can be transferred to the container by pouring the free flowing powder forming the silicone based material into the container or by injecting the silicone based material into the container. The amount of the silicone based material transferred to the container may be effective to completely cover the fibers 224. Alternatively, the fibers may project from the covering of the particulate silicone based material.

It is believed that it may be desired to have the fibers 224 (FIG. 12) completely enclosed by the particulate silicone based material of the matrix 222. When this is to be done, the bottom of the container is covered with a layer of the particulate silicone based material before the fibers 224 are positioned in the container. When the fibers 224 are positioned in the container, they are positioned so that the fibers do not touch the sides of the container. Particulate silicone based material is then poured into the container. If desired, additional fibers 224 may be added to the fibers already in the container after the container has been partially filled with particulate silicone material. The container is filled with particulate silicone material to a level above the fibers 224.

Once the fibers 224 have been completely enclosed by the particulate silicone material, pressure is applied against the particulate silicone material. For example, a pressure of approximately 1,000 psi may be applied against the particulate silicone based material and fibers 224. However, a greater or lesser pressure may be applied against the silicone based material in the container. Alternatively, the step of applying pressure against the silicone based material in the container may be omitted. However, as was previously mentioned, the application of pressure against the particulate silicone based material forming the matrix 22 and the fibers 224 results in the matrix having a finer grain than is achieved without the application of pressure.

Regardless of whether or not pressure is applied against the particulate silicone based material forming the matrix 222 (FIG. 12), the particles of the silicone based material interconnect with each other in such a manner as to grip the fibers 224. This results in a secure bond being formed between the fibers 224 and the matrix 222. Therefore, the fibers 224 are effective to reinforce the matrix 222.

In the embodiment of the invention illustrated in FIG. 13, the fibers 234 are woven. When the solid body 230 is to be formed, separate layers of the woven fibers 234 may be placed into a container on top of each other. The particulate silicone based material is then transferred to the container. The particulate silicone based material is a free flowing powder which fills the space between the individual fibers 234 in the woven layers.

When it is desired to have the woven layers of fibers 234 spaced from the exterior surface of the solid body 230, a layer of particulate silicone based material may be positioned in the bottom of the container. A woven fiber layer 234 is then be placed in the container on the layer of particulate silicone based material. Additional silicone based material may be positioned over the layer of fibers. A next succeeding layer of fibers may be positioned on the silicone material overlying the first layer of fibers. This is repeated with particulate silicone based material being transferred to the container on top of each successive layer of fibers. The fibers in each layer of fibers are maintained in a spaced apart relationship with the sides of the container so that the fibers do not extend through the silicone based material forming the matrix 232.

When the stack of layers of woven fibers 234 (FIG. 13) has been built up to a desired height in the container 234, a final layer of particulate silicone based material is applied to the upper most layer of fibers. This results in the stacked layers of woven fibers 234 being completely enclosed by the particulate silicone based material of the matrix 232. The particulate silicone based material of the matrix extends between each of the fibers 234 in a woven layers of fibers and permeates the stack of layers of fibers.

Pressure, approximately 1,000 psi, may then be applied against the particulate silicone based material of the matrix 232 and the layers of woven fibers 234. This results in a compacting of the silicone based material and layers of fibers. The silicone based material completely fills the stack of woven layers of fibers.

The greater the pressure utilized to pack the powder silicone based material into the container, the finer will be the particles formed and interconnected during heating of the silicone based material to a temperature of about 200° F. to about 400° F. Thus, if the particulate silicone based material is merely poured into the container along with the stacked layers of woven fibers 234, without the application of pressure to pack the silicone based material, relatively coarse particles are formed and are interconnected upon heating the silicone based material. If the particulate silicone based material is firmly packed into the container, relatively fine particles are formed and interconnected upon heating of the silicone based material.

The container holding the layers of woven fibers 234 and the particulate silicone based material, may be placed in a conventional apparatus for heating, such as an oven. The container and silicone based material are heated to a temperature of about 200° F. to about 400° F. The particulate silicone based material is shaped to a desired configuration by the container. This results in the matrix 232 of the solid body 230 having a desired configuration.

Although the particulate silicone based material may be lightly packed into the container and then pressurized before the container is placed in the heating apparatus, pressure may or may not be applied against the particulate silicone based material while it is in the heating apparatus. However, if desired, pressure may be applied against the silicone based material and layers of fibers 234 as they are heated. As the silicone based material is heated, the particles of the silicone based material become interconnected to form a unitary, one-piece composite article which encapsulates and is reinforced by the layers of woven fibers 234.

After being at a temperature of between about 200° F. and about 400° F. for a period of time, for example for about thirty minutes, the container, with the connected particles of silicone based material and layers of woven fibers 234 therein, is removed from the oven and allowed to cool. Upon cooling to ambient (room) temperature (70° F.), the silicone based material and the layers of fibers 234 form a rigid composite. The silicone based material and the layers of fibers 234 are then removed from the container and form the solid body 230.

The solid body 230 produced by the process of the present invention has a smooth surface which is free of macro-irregularities such as surface imperfections and cracks that are visible to the naked eye. It is believed that this smooth surface can be attributed to using a minimal amount of a soltentless binder. By using only a minimal amount of soltentless binder, the silicone based material, when curing, produces a minimal amount of off gassing (i.e., bubbles of gas by-products that are formed by the curing chemical reaction).

The resulting solid body 230 (FIG. 13) is resistant to melting and thermal decomposition when heated to temperatures of at least about 3000° F. The solid body 230 does not deflect or otherwise deform when the solid body is heated to a temperature of at least about 3000° F. and force is applied against the solid body.

When the one-piece solid composite body 230 is heated to a temperature of approximately 5000° F., the solid body does not deform under the application of a force resulting from dropping of the body through a distance of approximately 3 feet onto a concrete floor. In addition, there is no significant thermal decomposition of the one-piece solid body 230 when it is heated to a temperature of approximately 5000° F. By utilizing ceramic fibers 234, degradation of the fibers is avoided when the solid body 230 is heated to a temperature of approximately 5000° F.

If desired, small hollow elements may be included along with the fibers 224 or 234 in the matrix 232 or 234. These small hollow elements may be similar to the previously described hollow glass spheres used to form the cavities 164 (FIG. 9). By mixing small hollow elements with the particulate silicone based material used to form the matrix 222 (FIG. 12) or the matrix 232 (FIG. 13), the weight of the fiber reinforced body 220 or 230 is reduced. In addition, the heat conductivity of the fiber reinforced body 220 or 230 is reduced by the formation of cavities in the matrix. The weight of the fiber reinforced body 220 or 230 may be further reduced by using hollow fibers in combination with small hollow elements, such as hollow microspheres.

Layered Fiber Reinforced Article

It is contemplated that it may be desired to form the solid body 220 or the solid body 230 with a layered construction. The solid body 220 or 230 may be formed with an outer layer which is free of fibers. The fibers 224 or 234 may be encapsulated by silicone based material which is free of fibers. If this is done, the outer surfaces of the bodies 220 and 230 would be formed by silicone based material and would not include exposed fibers.

Figure 14:
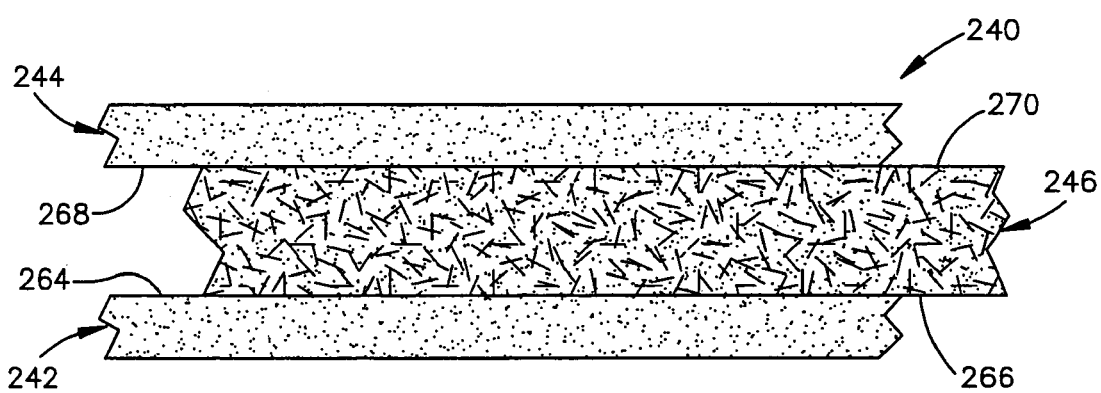
FIG. 14 is a schematic sectional view of a layered body having upper and lower layers formed the silicone based material and an intermediate layer formed by fibers in a matrix of silicone based material.

A solid layered body 240 is illustrated in FIG. 14. The layered body 240 includes a lower layer 242 and an upper layer 244. The upper and lower layers 242 and 244 are formed of a particulate silicone based material without the addition of any fibers 224 or 234. This results in the lower and upper layers 242 and 244 being relatively dense, as compared to the solid bodies 220 or 230 of FIGS. 12 and 13.

A center or intermediate layer 246 is formed by the particulate silicone based material and the nonwoven fibers 224 or the woven fibers 234. If desired, relatively short chopped fibers may be provided in the center layer 246. Alternatively, long fibers may be provided with longitudinal axes of the fibers aligned with either a transverse or a longitudinal axis of the center layer 246. The edges of the center layer 246 may be closed by silicone based material extending between the lower and upper layers 242 and 244. Alternatively, the edges of the center layer 246 may be exposed.

The lower and upper layers 242 and 244 are securely connected to the center layer 246. Thus, the particulate silicone based material of the lower and upper layers 242 and 244 are connected to and bond with the particulate silicone material of the center layer 246 to form a solid unitary composite article. It is believed that the interconnection of the layers 242–246 may be the result of agglomeration of particles in the manner previously described herein. However, it should be understood that interconnection of the layers 242–246 may be the result of other phenomenon.

The lower layer 242 has an upper side surface 264 which bonds to the lower side surface 266 of the center layer 246. Similarly, the upper layer 244 has a lower side surface 268 which bonds to an upper side surface 270 of the center layer 246. The resulting one-piece article has a laminated construction with relatively dense lower and upper layers 242 and 244 disposed on opposite sides of a center layer 246 having a lower density. The density of the center layer 246 may be promoted by utilizing hollow fibers in the center layer and/or by providing small hollow spheres in the center layer along with the fibers. Of course, small hollow spheres may be provided in the lower and upper layers 242 and 244 to reduce their density.

When the layered body 240 is to be formed, a container or mold 296 (FIG. 15) may be utilized. The container 296 has a cavity 298 corresponding to the desired configuration of the layered body 240. Particulate silicone based material is prepared in the same manner as was previously described in conjunction with the embodiments of the invention illustrated in FIGS. 1–8. If desired, small hollow elements may be provided in the particulate silicone based material in the manner previously described herein in conjunction with FIGS. 9–11.

Figure 15:
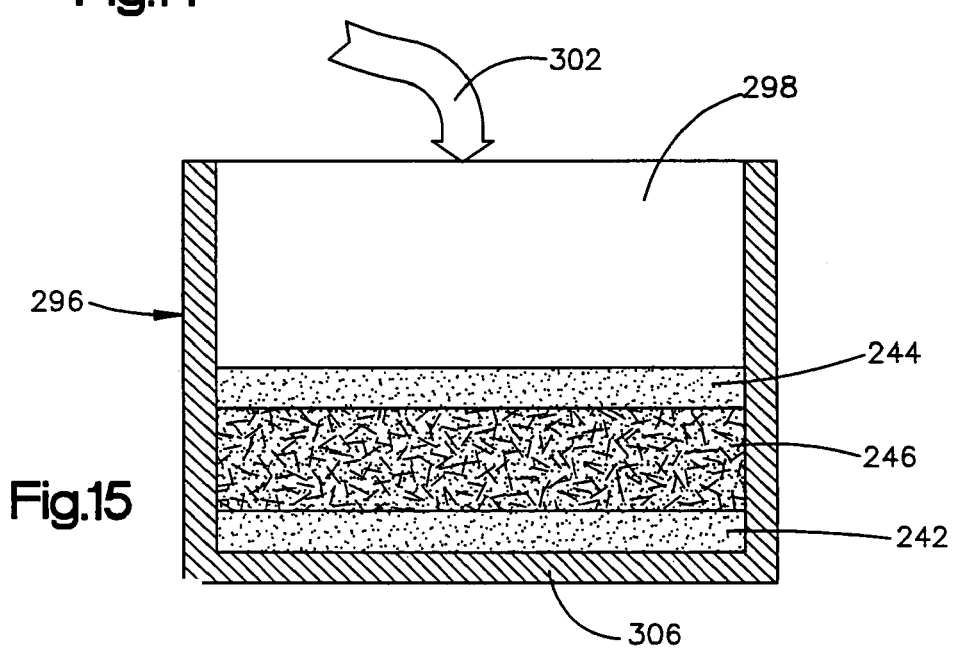
FIG. 15 is a schematic illustration of a mold which is utilized to form the layered body of FIG. 14.

The free flowing particulate silicone based material is poured into the cavity 298 in the manner illustrated schematically by an arrow 302 in FIG. 15. The particulate silicone based material moves into engagement and covers a bottom wall 306 of the container 296. The particulate silicone based material overlies the bottom wall 306 of the container to form the lower layer 242 of the layered body 240.

Once the particulate silicone based material which is to form the lower layer 242 of the layered body 240 has been poured into the container or mold 296, pressure may be applied against the particulate silicone based material to compact the particulate silicone based material. If desired, a press assembly, similar to the press assembly of FIG. 5, may be utilized to apply pressure against the particulate silicon based material forming the lower layer 242.

The force applied against the particulate silicone based material of the lower layer 242 reduces the volume occupied the silicone based material. Either a relatively low pressure or a relatively high pressure may be applied against the particulate silicone based material forming the lower layer 242 in the container 296. For example, a press may be actuated to apply force of approximately ten pounds per square inch (10 psi) against the particulate silicone based material in the lower layer 242. Alternatively, the press may apply a pressure of at least one thousand pounds per inch (1,000 psi) against the particulate silicone based material in the lower layer 242. However, if desired, the step of applying pressure against the lower layer 242 of the particulate silicone based material may be omitted.

After the lower layer 242 of the particulate silicone based material has been formed in the container 296, either the unwoven fibers 224 (FIG. 12) or the woven fibers 234 (FIG. 13) are positioned in the container 296 on the lower layer 242. If desired, chopped fibers may be positioned in the container 296 on the lower layer 242. After the fibers have been positioned in the container 296, the particulate silicone based material is poured into the container, in the manner indicated schematically by the arrow 302 in FIG. 15. If desired, small hollow elements may be mixed with the particulate silicone based material in the manner described in conjunction with FIGS. 9–11 herein. The fibers may be either solid or hollow.

The particulate silicone based material permeates the unwoven fibers 224 or woven fibers 234 in the container 296 to form the fiber reinforced center layer 246 of the layered body 240 (FIG. 14). If small hollow elements are provided in the particulate silicone based material, the small hollow elements move into spaces between the fibers along with the particulate silicone based material. Pressure may be applied against the particulate silicone based material and fibers forming the center layer 246.

Once the center layer 246 has been positioned in the container 296, with or without the application of pressure to the center layer, the particulate silicone based material forming the upper layer 244 is poured into the container, in the manner indicated schematically by the arrow 302 in FIG. 15. The particulate silicone based material forming the upper layer 244 does not contain fibers. However, small hollow elements may be provided in the upper layer 244.

The particulate silicon based material of the upper layer 244 may be pressed against the center layer 246 and lower layer 242 with either a relatively small or relatively large force. For example, a press may be operated to apply a pressure of ten pounds per square inch (10 psi) against the particulate silicone based material in the upper layer 244. Alternatively, a pressure of at least one thousand pounds per square inch (1,000 psi) may be applied against the particulate silicone based material of the upper layer 244. If desired, the step of applying pressure against the particulate silicone based material forming the upper layer 244 may be omitted.

In the foregoing description, pressure was sequentially applied against each of the layers 242, 244 and 246 as they were poured into the container 296. However, pressure may be applied against only the last layer 244 to compress all three layers 242–246. Alternatively, the step of applying pressure against the layers 242–246 may be omitted.

Once the layers 242–246 have been formed in the container 296, the layers are heated. The layers are heated to a temperature between about 200° F. and about 400° F. For example, the layers 242–246 may be heated to a temperature of approximately 300° F. for a period of approximately thirty minutes. During heating of the layers 242–246, pressure can be maintained on the layers if desired.

When heating the layers 242–246, it is believed that the relatively fine particles of the silicone based material agglomerate to form coarser particles. As the particle size is apparently increasing, the adjacent particles are interconnected to form a unitary composite layered body 240 having the layers 242–246. Although it is believed that the fine particles of the silicone based material are interconnected to form coarser particles which interconnect to form a solid unitary composite article having a plurality of layers, the fine particles of the silicone based material may be interconnected without forming coarser particles. This is particularly true when the layers 242–246 have been compacted by the application of pressure to the layers.

When the layers 242–246 are at a temperature between 200° F. and about 400° F., the layers can be easily deformed plastically by the application of force to the layers. When the one-piece composite article formed by the layers 242–246 has been cooled to a temperature below 200° F. and above ambient temperature, the one-piece solid layered article 240 can still be manually deformed to change the configuration of the layered body.

In the foregoing description the particulate silicone material is poured into the container 296 onto the fibers 224 or 234 of the center layer 246. However, it is contemplated that the fibers 224 or 234 may be coated with the silicone based material before they are placed in the container 296. This may be done by wetting the fibers with a solvent and engaging the fibers with particulate silicone based material. The wet fibers and powdered silicone based material adhere to each other to form a covering of the silicone based material over the fibers.

It is also contemplated that the fibers 224 or 234 may be covered with the particulate silicone based material by forming the silicone based material into a viscous body. This may be done by adding a substantial amount of solvent, such as xylene, to the particulate silicone based material. The solvent causes the silicone based material to form a thick viscous body. The silicone based material of this thick viscous body will adhere to the fibers 224 or 234. This allows the fibers 224 or 234 to be covered with the silicone based material before the fibers are placed in the cavity 298 in the container 296. Of course, once the fibers 224 or 234 are then placed into the container, additional silicone based material may be applied to the fibers. This may be done by positioning the thick viscous silicone based material in the container 296 along with the covered fibers or by positioning particulate silicone based material in the container 296.

From the above description of the invention, those skilled in the art will perceive improvements, changes, and modifications in the invention. Such improvements, changes, and modifications within the skill of the art are intended to be covered by the appended claims.

The invention claimed is:

1. A method of forming a heat resistant body, said method comprising the steps of:

providing a mixture particulate silicone based material and small elements which are hollow, heating the mixture of partlcuiate silicone based material and small elements which am hollow to a temperature between about 200° F. and 400° F., and cooling the particulate silicone based material until a solid body is formed, said solid body contains cavities which were formed In the particulate silicone based material by the small elements, said solid body being resistant to melting and thermal decomposition when heated to temperatures of at least 3000° F.

2. A method as set forth in claim 1 further including the step of forming a layer of particulate silicone based material which is free of the small elements which are hollow on at least one side of the mixture of particulate silicone based material and small elements which are hollow, heating the layer of particulate silicone based material to a temperature between about 200° F. and about 400° F. along with the mixture of particulate silicone based material and small elements which are hollow, and cooling the layer of particulate silicone based material along with the particulate silicone based material was mixed with the small elements which are hollow, said layer of particulate silicone based material and the particulate silicone based material which was mixed with the small elements which are hollow form a solid one-piece body which is resistant to melting and thermal decomposition when heated to a temperature of at least 3000° F.

3. A method as set forth in claim 2 further including the step of sequentially placing the particulate silicone based material which is free of small elements which are hollow and the mixture of particulate silicone based material and small elements which are hollow in a forming cavity to form a body having a layered construction and having a configuration corresponding to the configuration of the forming cavity.

4. A method as set forth in claim 3 further including the step of applying pressure against the layer of silicone based particulate material and against the mixture of particulate silicone based material and small elements which are hollow while they are disposed in the forming cavity.

5. A method as set forth in claim 3 wherein said step of sequentially placing the particulate silicone based material which is free of small elements which are hollow in the forming cavity includes conducting a flow of discrete particles of the silicone based material which is free of the small elements which are hollow into the forming cavity and thereafter conducting a flow of the mixture of particulate silicone based material and small elements which are hollow into the forming cavity.

6. A method as set forth in claim 3 wherein said step of sequentially placing the particulate silicone based material which is free of small elements which are hollow and the mixture of particulate silicone based material and small elements which are hollow in the forming cavity includes conducting a flow of the mixture of particulate and small elements which are hollow into the forming cavity and thereafter conducting a flow of discrete particles of the silicone based material which is free of small elements which are hollow into the forming cavity.

7. A method as set forth in claim 3 wherein said step of cooling the particulate silicone base material is performed with the body having a layered construction disposed in the forming cavity.

8. A method as set forth in claim 3 wherein said step of cooling the particulate silicone base material includes removing the body having a layered construction from the forming cavity before the body having a layered construction has cooled to ambient temperature and while the body having a layered construction is malleable.

9. A method as set forth in claim 2 further including the step of applying pressure against the layer of silicone based particulate material and against the mixture of particulate silicone based material and small elements which are hollow.

10. A method as set forth in claim 2 further including the step of shaping the layer of particulate silicone based material and the particulate silicone based material which is mixed with small elements which are hollow to a desired configuration prior to heating of the layer of particulate silicone based material and the particulate silicone based material which is mixed with small elements which are hollow to a temperature between about 2000° F. and 4000° F.

11. A method as set forth in claim 2 further including the step of shaping the layer of particulate silicone based material and the particulate silicone based material which is mixed with small elements which are hollow to a desired configuration after heating of the layer of particulate silicone based material and the particulate silicone based material which is mixed with small elements which are hollow to a temperature between about 200° F. and 400° F.

12. A method as set forth in claim 1 further including the steps of providing a turbine engine component, and applying the mixture of particulate silicone based material and small elements which am hollow to at least a portion of the turbine engine component, said steps of heating the mixture of particulate silicone based material and small elements which am hollow and coding the partlcuiate silicone based material include forming a covering over at least a portion of the turbine engine component.

13. A method as set forth in claim 12 wherein said step of shaping the mixture of particulate silicone based material and small elements which are hollow to a desired configuration includes applying pressure against the mixture of particulate silicone based material and small elements which are hollow.

14. A method as set forth in claim 13 wherein the cavity is at least partially defined by a surface of a member, said method further includes separating the solid body of particulate silicone based material from the cavity while maintaining the solid body of particulate silicone based material in engagement with the member.

15. A method as set forth in claim 1 wherein the particulate silicone based material comprises a silicone molding compound, a silicone resin, and a catalyst.

16. A method as set forth in claim 15 wherein the silicone molding compound comprises silica and a silesquioxane polymer.

17. A method as set forth in claim 15 wherein the silicone molding compound is a powder and the silicone resin is a liquid, said silicone resin when mixed with the silicone molding compound being absorbed by the silicone molding compound.

18. A method as set forth in claim 1 further including the step of placing a layer of silicone based material which is free of small elements which are hollow in a forming cavity, applying pressure against the layer of silicone based material in the forming cavity, placing a layer of the mixture of particulate silicone based material and small elements which are hollow in the forming cavity, and applying pressure against the layer of the mixture of particulate silicone based material and small elements which are hollow in the forming cavity.

19. A method as set forth in claim 18 further including the steps of placing a second layer of silicone based material which is free of small elements which are hollow in the forming cavity, and applying pressure against the second layer of silicone based material in the forming cavity.

20. A method as set forth in claim 18 wherein the small elements which are hollow in the layer of the mixture of particulate silicone based material and small elements which are hollow are glass microspheres.

21. A method as set forth in claim 18 wherein the small elements which are hollow in the layer of the mixture of particulate silicone based material and small elements which are hollow are fibers.

22. A method as set forth in claim 1 further including the step of shaping the mixture of a partlcuiate silicone based material and small elements which am hollow to a desired configuration prior to heating the mixture of silicone based material and small elements which am hollow.

23. A method set forth in claim 22 wherein said step of shaping the mixture of particulate silicone based material and small elements which are hollow to a desire configuration includes placing the mixture of particulate silicone based material and small elements which are hollow in a cavity having a configuration which corresponds to a desire configuration of at least a portion of the solid body which contains cavities which were formed in the particulate silicone based material by the small elements which are hollow.

24. A method as set forth in claim 1 wherein the mixture of particulate silicone based material and small elements which are hollow is formed by mixing the small elements which are hollow with a silicone molding compound and, thereafter, wetting the mixture of small elements which are hollow and silicone molding compound with a liquid silicone resin.

25. A method as set forth in claim 1 wherein at least a majority of the small elements which are hollow are spheres which have a particle size, by volume, of between 15 and 135 microns.

26. A method as set forth in claim 1 further including the step of applying a covering of the mixture of particulate silicone based material and small elements which are hollow to a base member, said step of heating the mixture of particulate silicone base material and small elements which are hollow is at least partially performed with the mixture of particulate silicone based material and small elements which are hollow on the base member.

27. A method as set forth in claim 1 further including the steps of electrostatically charging particles of the mixture of particulate silicone based material and small elements which are hollow, directing a flow of electrostatically charged particles of the mixture of particulate silicone based material and small elements which are hollow toward a base member, and electrostatically adhering the charged particles of the mixture of particulate silicone based material and small elements which are hollow to the base member, said step of cooling the particulate silicone based material is performed with the mixture of particulate silicone based material and small elements which are hollow disposed on the base member.

28. A method as set forth in claim 1 wherein said step of heating the mixture of particulate silicone based material and small elements which are hollow includes expanding the small elements which are hollow.

29. A method as set forth in claim 1 wherein said step of heating the mixture of particulate silicone based material and small elements which are hollow includes interconnecting particles of the particulate silicone based material to form one-piece in which the small elements which are hollow are at least partially disposed.

30. A method as set forth in claim 1 wherein said step of providing a mixture of particulate silicone based material and small elements which are hollow includes mixing a powdered silicone molding compound containing silica powder and a liquid silicone resin, absorbing the liquid silicone resin with the powdered silicone molding compound to form a dry particulate which flows so as to conform to the configuration of a container in which the dry particulate is placed, and mixing the small elements which are hollow with the dry particulate to form a mixture which flows so as to conform to the configuration of a container in which the mixture is placed.

31. A method as set forth in claim 1 further including the step of injection molding the mixture of particulate silicone based material and small elements which are hollow.

32. A method as set forth in claim 1 further including the step of extruding the mixture of particulate silicone based material and small elements which are hollow.

33. A method as set forth in claim 1 further including the steps of providing a base member, and applying the mixture of particulate silicone based material and small elements which are hollow to at least a portion of the base member, said step of cooling the particulate silicone based material is performed with the particulate silicone based material disposed on the based member.

34. A method of forming a heat resistant body, said method comprising the steps of:
   forming a first layer of particulate silicone based material,
   forming a second layer containing a mixture of particulate silicone based material and small hollow spheres adjacent to the first layer,
   forming a third layer of particulate silicone based material adjacent to the second layer,
   heating the first, second, and third layers to a temperature between about 200° F. and 400° F., and
   cooling the first, second, and third layers until a solid body is formed, said solid body being resistant to melting and thermal decomposition when heated to a temperature of at least 3000° F.

35. A method as set forth in claim 34 wherein said step of forming a first layer includes placing particulate silicone based material in a forming cavity to form the first layer with a configuration corresponding to a configuration of a first portion of the forming cavity, said step of forming a second layer includes placing a mixture of particulate silicone based material and small hollow spheres in the forming cavity to form the second layer with a configuration corresponding to a configuration of a second portion of the forming cavity, said step of forming a third layer includes placing particulate silicone based material in the forming cavity to form the third layer with a configuration corresponding to a configuration of a third portion of the forming cavity.

36. A method as set forth in claim 35 further including the step of applying pressure against the first, second, and third layers while they are disposed in the forming cavity.

37. A method as set forth in claim 35 wherein said step of cooling the first, second, and third layers is performed with the first, second, and third layers in the layers in the forming cavity.

38. A method as set forth in claim 34 further including the step of applying pressure against the first, second, and third layers prior to performing said step of heating the first, second and third layers.

39. A method as set forth in claim 38 wherein said step of applying pressure against the first, second, and third layers is performed after performing said step of forming a third layer.

40. A method as set forth in claim 34 wherein the particulate silicone based material in the first, second, and third layers comprises a silicone molding compound, a silicone resin, and a catalyst.

41. A method as set forth in claim 40 wherein the silicone molding compound comprises silica and a silesquioxane polymer.

42. A method as set forth in claim 34 wherein said step of applying pressure against the first, second, and third layers includes applying pressure against the first layer prior to forming the second layer and applying pressure against the second layer prior to forming the third layer.

43. A method as set forth in claim 34 wherein said step of applying pressure against the first, second and third layers is at least partially performed prior to heating the first, second, and third layers to a temperature between about 200° F. and 400° F.

44. A method as set forth in claim 34 wherein said step of applying pressure against the first, second, and third layers is at least partially performed after heating the first, second, and third layers to a temperature between about 200° F. and 000° F.

45. A method as set forth in claim 34 wherein at least a majority of the small spheres in the second layer are microspheres having a particle size, by volume, of between 15 an 135 microns.

46. A method as set forth in claim 34 wherein said step of heating the first, second, and third layersincludes interconnecting particles of the particulate silicone based material in the first layer and particles of the particulate silicone based material in the second layer and interconnecting particles of the particulate silicone based material in the second layer and particles of the particulate silicone based material in the third layer.

47. A method as set forth in claim 34 wherein the small hollow spheres are disposed only in the second layer and the first and third layers are free of small hollow spheres.

48. A method as set forth in claim 34 further including the step of shaping the first, second, and third layers to a desired configuration prior to heating the first, second, and third layers to a temperature between about 200° F. and 400° F.

49. A method as set forth in claim 34 further including the step of shaping the first, second, and third layers to a desired configuration after heating the first, second, and third layers to a temperature between about 2000° F. and 400° F.

50. A method of forming a heat resistant body, said method comprising the steps of:
at least partially covering fibers with a silicone based material,
heating the silicone based material and the fibers to a temperature between about 200° F. and 400° F. while the silicone based material at least partially covers the fibers, and
cooling the silicone based material until a solid body containing the fibers is formed, said solid body being resistant to melting and thermal decomposition when heated to a temperature of at least 3000° F.

51. A method as set forth in claim 50 wherein the silicone based material includes a silicone molding compound, a silicone resin, and a catalyst.

52. A method as set forth in claim 51 wherein the silicone molding compound comprises silica and a silesquioxane polymer.

53. A method as set forth in claim 51 wherein the molding compound is a powder and the silicone resin is a liquid, said silicone resin when mixed with the silicone molding compound being absorbed by the silicone molding compound.

54. A method as set forth in claim 50 wherein said step of at least partially covering fibers with silicone based material includes placing fibers and silicone based material in a container with the fibers being at least partially covered by the silicone based material.

55. A method as set forth in claim 54 further including the step of applying pressure against the silicone based material and the fibers while they are in the container.

56. A method as set forth In claim 50 wherein said step of at least partially covering fibers with silicone based material includes placing the fibers in a container and, thereafter, conducting a flow of silicone based material into the container.

57. A method as set forth in claim 56 further including the step of conducting a flow of silicone material into the container prior to performance of said step of placing fibers in the container.

58. A method as set forth In claim 50 wherein said step of at least partially covering fibers with a silicone based material includes covering non-woven fibers with the silicone based material.

59. A method as set forth in claim 50 wherein said step of at least partially covering fibers with a silicone based material includes covering woven fibers with the silicone based material.

60. A method as set forth in claim 50 wherein said step of at least partially covering fibers with a silicone based material includes covering chopped fibers with the silicone based material.

61. A method has set forth in claim 50 wherein said step of at least partially covering fibers with silicone based material includes coating the fibers with silicone based material and, thereafter, placing the coated fibers in a container.

62. A method as set forth in claim 50 wherein said step of at least partially covering fibers with silicone based material includes covering fibers with a particulate silicone based material.

63. A method as set forth in claim 50 wherein said step of at least partially covering fibers with silicone based material includes moving particulate silicone based material between a plurality of fibers.

64. A method as set forth in claim 50 wherein said step of heating the silicone based material and fibers includes interconnecting particles of the silicone based material to form one-piece in which the fibers are at least partially disposed.

65. A method as set forth in claim 50 wherein said step of at least partially covering fibers with silicone based material includes wetting the fibers and engaging the wet fibers with particulate silicone based material.

66. A method as set forth in claim 50 wherein said step of at least partially covering fibers with silicone based material includes mixing solvent with particulate silicone based material to form a viscous body and engaging the fibers with the viscous body.

67. A method as set forth in claim 50 further including the steps of forming the silicone based material by mixing a powdered silicone molding compound containing silica powder and a liquid silicone resin, absorbing the liquid silicone resin with the powdered silicone molding compound to form a dry particulate, said step of covering the fibers with silicone based material includes covering the fibers with the dry particulate.

68. A method as set forth in claim 50 wherein the fibers are chopped fibers and said step of at least partially covering the fibers with the silicone based material includes mixing the chopped fibers with the silicone based material.

69. A method as set forth in claim 50 further including the steps of providing a base member, and applying fibers and silicone based material to the base member, said step of cooling the silicone based material is performed with the silicone based material disposed on the base member.

70. A method as set forth in claim 50 further including forming a layer of silicone based material which is free of fibers and placing the fibers which are covered with silicone based material and the layer of silicone based material which is free of fibers in engagement.

71. A method as set forth in claim 50 wherein said step of at least partially covering fibers with a silicone based material includes covering the fibers with a particulate silicone based material.

72. A method as set forth in claim 50 further including the step of applying pressure against the silicone based material and the fibers after performing said step of covering the fibers with the silicone based material.

73. A method as set forth in claim 50 further including the step of shaping the silicone based material and fibers to a desired configuration prior to heating the silicone based material and fibers to a temperature between about 200° F. and 400° F.

74. A method as set forth in claim 50 further including the step of shaping the silicone based material and fibers to a desired configuration after heating the silicone based material and fibers to a temperature between about 200° F. and 400° F.

75. A method as set forth in claim 50 wherein said step of at least partially covering fibers with a silicone based material includes at least partially covering ceramic fibers with a particulate silicone based material.

76. A method as set forth in claim 50 wherein said step of at least partially covering fibers with a silicone based material includes at least partially covering carbon fibers with a particulate silicone based material.

77. A method of forming a heat resistant body, said method comprising the step of
  at least partially covering small elements which are hollow with a silicone based material,
  at least partially covering fibers with the silicone based material,
  heating the small hollow elements, fibers, and silicone based material to a temperature between about 200° F. and 400° F. while the small hollow elements and fibers are at least partially covered by the silicone based material, and
  cooling the small hollow elements, fibers, and silicone based material until a solid body is formed, said solid body being resistant to melting and thermal decomposition when heated to a temperature of at least 3000° F.

78. A method as set forth in claim 77 wherein said step of at least partially covering small elements which are hollow with a silicone based material includes forming a mixture of particulate silicone based material and the small elements which are hollow, said step of covering fibers with the silicone based material includes covering the fibers with the mixture of particulate silicone based material and the small elements which are hollow.

79. A method as set forth in claim 77 wherein said step of covering small elements which are hollow with a silicone based material includes forming a mixture of particulate silicone based material and the small elements which are hollow, said step of covering fibers with the silicone based material includes covering the fibers with particulate silicone based material.

* * * * *

UNITED STATES PATENT AND TRADEMARK OFFICE
CERTIFICATE OF CORRECTION

PATENT NO. : 7,098,275 B2
APPLICATION NO. : 10/681989
DATED : August 29, 2006
INVENTOR(S) : Charles F. Inglefield It is certified that error appears in the above-identified patent and that said Letters Patent is hereby corrected as shown below:

Claim 1 Column 32, line 62, before "hollow" delete "am" and insert --are--.

Claim 1 Column 32, lines 66, after "formed" delete "In" and insert --in--.

Claim 10 Column 34, line 8, after "about" delete "2000°F. and 4000°" and insert --200°F and 400°--

Claim 12 Column 34, line 21, before "hollow" delete "am" and insert --are--.

Claim 12 Column 34, line 24, before "hollow" delete "am" and insert --are--.

Claim 22 Column 35, line 9, before "hollow" delete "am" and insert --are--.

Claim 22 Column 35, line 11, before "hollow" delete "am" and insert --are--.

Claim 23 Column 35, line 14, after "hollow to a" delete "desire" and insert --desired--.

Claim 23 Column 35, line 17, after "corresponds to a" delete "desire" and insert --desired--.

Claim 23 Column 37, line 18, before "°F". delete "000" and insert --200--.

Claim 46 Column 37, line 24, after "third" delete "layersincludes" and insert --layers includes--.

Claim 49 Column 37, line 42, after "about" delete "2000°F" and insert --200°F--.

Signed and Sealed this

Seventeenth Day of April, 2007

JON W. DUDAS
*Director of the United States Patent and Trademark Office*